US012720122B2

(12) United States Patent
Belkine

(10) Patent No.: US 12,720,122 B2
(45) Date of Patent: Aug. 25, 2026

(54) IMPLEMENTING HIGH DYNAMIC RANGE DISPLAY TECHNOLOGY IN A REMOTE DESKTOP ENVIRONMENT

(71) Applicant: Microsoft Technology Licensing, LLC, Redmond, WA (US)

(72) Inventor: Artem Belkine, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/651,187

(22) Filed: Apr. 30, 2024

(65) Prior Publication Data

US 2025/0337965 A1 Oct. 30, 2025

(51) Int. Cl.
*H04N 19/98* (2014.01)
*G06F 9/451* (2018.01)
*H04N 19/186* (2014.01)

(52) U.S. Cl.
CPC ............ *H04N 19/98* (2014.11); *G06F 9/452* (2018.02); *H04N 19/186* (2014.11)

(58) Field of Classification Search
None
See application file for complete search history.

(56) References Cited

U.S. PATENT DOCUMENTS

2004/0255227 A1* 12/2004 Borsum .................... G06F 5/10 714/790
2006/0053212 A1 3/2006 Lin
2007/0046980 A1 3/2007 Coleman et al.
2008/0209048 A1 8/2008 Sampath et al.
2009/0285496 A1 11/2009 Collins
2010/0077085 A1 3/2010 Cohen
2010/0146127 A1 6/2010 Schmieder
(Continued)

FOREIGN PATENT DOCUMENTS

CN 114117283 A 3/2022
WO 2021130500 A1 7/2021

OTHER PUBLICATIONS

Twiest, et al., "How to configure multiple monitors for remote desktop use", accessed on link https://www.techtarget.com/searchvirtualdesktop/tip/How-to-configure-multiple-monitors-for-remote-desktop-use, Feb. 27, 2023, 4 pages.
(Continued)

*Primary Examiner* — Clifford Hilaire
(74) *Attorney, Agent, or Firm* — Shook, Hardy & Bacon L.L.P.

(57) ABSTRACT

Methods, computer systems, and computer-storage media are provided for facilitating implementation of high dynamic range display technology in a remote desktop environment. In embodiments, graphical data is obtained, at a video driver of a remote desktop server, for presenting in association with a remote desktop client device. The graphical data is provided to a high dynamic range (HDR) video encoder, logically separated from the video driver, based on an indication to use the HDR video encoder to encode. Thereafter, the graphical data is encoded via the HDR video encoder, and such encoded graphical data is provided to a remote access protocol stack in a terminal service of the remote desktop server for transmitting the encoded graphical data to the remote desktop client device associated with the HDR monitor.

18 Claims, 7 Drawing Sheets

(56) References Cited

U.S. PATENT DOCUMENTS

| | | | | |
|---|---|---|---|---|
| 2010/0228871 | A1 | 9/2010 | Abdo et al. | |
| 2011/0304522 | A1 | 12/2011 | Zeng | |
| 2012/0082395 | A1 | 4/2012 | Abdo | |
| 2013/0156269 | A1 | 6/2013 | Matsui et al. | |
| 2013/0294689 | A1 | 11/2013 | Jia et al. | |
| 2014/0010289 | A1* | 1/2014 | Lukasik | H04N 19/172 375/E7.076 |
| 2014/0079113 | A1* | 3/2014 | Newton | G09G 5/02 375/240.01 |
| 2015/0063451 | A1 | 3/2015 | Zhu et al. | |
| 2015/0254048 | A1 | 9/2015 | Morton et al. | |
| 2017/0046013 | A1 | 2/2017 | Reskusich et al. | |
| 2017/0323418 | A1 | 11/2017 | Dror et al. | |
| 2017/0345125 | A1* | 11/2017 | Golas | G06T 11/40 |
| 2018/0063555 | A1 | 3/2018 | Raduchel et al. | |
| 2019/0028691 | A1* | 1/2019 | Hinds | H04N 21/4518 |
| 2019/0082138 | A1* | 3/2019 | Pan | H04N 5/20 |
| 2021/0287341 | A1* | 9/2021 | Birkbeck | G06T 5/70 |
| 2022/0345676 | A1 | 10/2022 | Nakajima | |
| 2023/0031245 | A1 | 2/2023 | Longhurst | |
| 2025/0336095 | A1 | 10/2025 | Belkine | |

OTHER PUBLICATIONS

International Search Report and Written Opinion received for PCT Application No. PCT/US2025/016178, mailed on Jun. 4, 2025, 15 pages.

"IPropertyStore interface (propsys.h)", retrieved from internet: https://learn.microsoft.com/en-us/windows/win32/api/propsys/nn-propsys-ipropertystore, Feb. 2024, 2 pages.

"Audio Devices DDI References" accessed on URL: https://learn.microsoft.com/pdf?url=https%3A%2F%2Flearn.microsoft.com%2Fen-us%2Fwindows%2Fwin32%2Fapi%2F_audio%2Ftoc.json, Oct. 3, 2023, 231 pages.

International Search Report and Written Opinion received for PCT Application No. PCT/US2025/015167, Apr. 16, 2025, 13 pages.

Non-Final office action mailed on Jan. 28, 2026, in U.S. Appl. No. 18/651,170, 17 pages.

"DisplayMonitor Class", Retrieved From: https://learn.microsoft.com/en-us/uwp/api/windows.devices.display.displaymonitor?view=winrt-22621, 2024, 5 Pages.

Notice of Allowance mailed on May 21, 2026, in U.S. Appl. No. 18/651,170, 08 pages.

* cited by examiner

IMPLEMENTING HIGH DYNAMIC RANGE DISPLAY TECHNOLOGY IN A REMOTE DESKTOP ENVIRONMENT

BACKGROUND

Remote desktop services enable users to access and control a remote computer or virtual machine from another device, providing a virtual desktop experience. Typically, a client device communicates with a remote desktop server via a terminal service using a remote desktop protocol (RDP) stack to facilitate communication. In conventional implementations, the RDP stack of the remote desktop server encodes data, such as graphical data, before transmitting it to the client device. Performing data encoding at the RDP stack, however, uses an extensive amount of computing resources to provide the raw data to the RDP stack for encoding. For example, to provide the unencoded data to the RDP stack, the unencoded data is synchronized and copied between the video driver and the RDP stack, thereby using an extensive amount of CPU and memory. Accordingly, this encoding process consumes significant CPU and memory resources, particularly as monitor resolutions increase. For instance, High Dynamic Range (HDR) monitors may require double the amount of memory and CPU usage for encoding due to their higher pixel density.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, facilitating implementation of HDR display technology in a remote desktop environment in an efficient and effective manner. In particular, data encoding is performed in association with the video driver, thereby enabling data encoding to occur in the same process as obtaining the unencoded (e.g., raw) data. In this way, rather than synchronizing and copying the unencoded data to the RDP stack for encoding before transmitting to a client device, the unencoded data is obtained at the video driver and encoded in association therewith. The encoded data can then be provided to a terminal service, such as the RDP stack, for transmitting to the client device. In operation, a video encoding manager and/or a video encoder(s) associated therewith may be initialized in association with an HDR video driver to perform the data encoding. Such a video encoding manager and/or HDR video encoder(s) may be logically separated from the video driver via an encoding interface. Further, the video encoding manager and/or a video encoder(s) associated therewith may perform tasks related to the internal protocol to communicate the encoded data to the RDP stack.

Further, to facilitate implementation of HDR display technology in a remote desktop environment, monitor configuration data is used to obtain suitable content and/or perform graphical data encoding (e.g., via an HDR video encoder). In particular, the video driver may obtain monitor configuration data for use in establishing HDR virtual monitors. In this way, the video driver may obtain graphical data associated with 8 bytes per pixel, as opposed to 4 bytes per pixel for a traditional monitor. The 8 bytes per pixel rate enables each pixel to be represented using 8 bytes of data, allowing for more complex and high-fidelity representations of images. For instance, each pixel in an HDR image may be represented using 8 bytes of data (or more) to accurately capture color, luminance, and/or other properties. Additionally or alternatively to obtaining the monitor configuration data, the video driver may provide the monitor configuration data to the HDR video encoder for use in encoding graphical data.

BRIEF DESCRIPTION OF THE DRAWINGS

The technology described herein is described in detail below with reference to the attached drawing figures, wherein.

DETAILED DESCRIPTION

Figure 1:
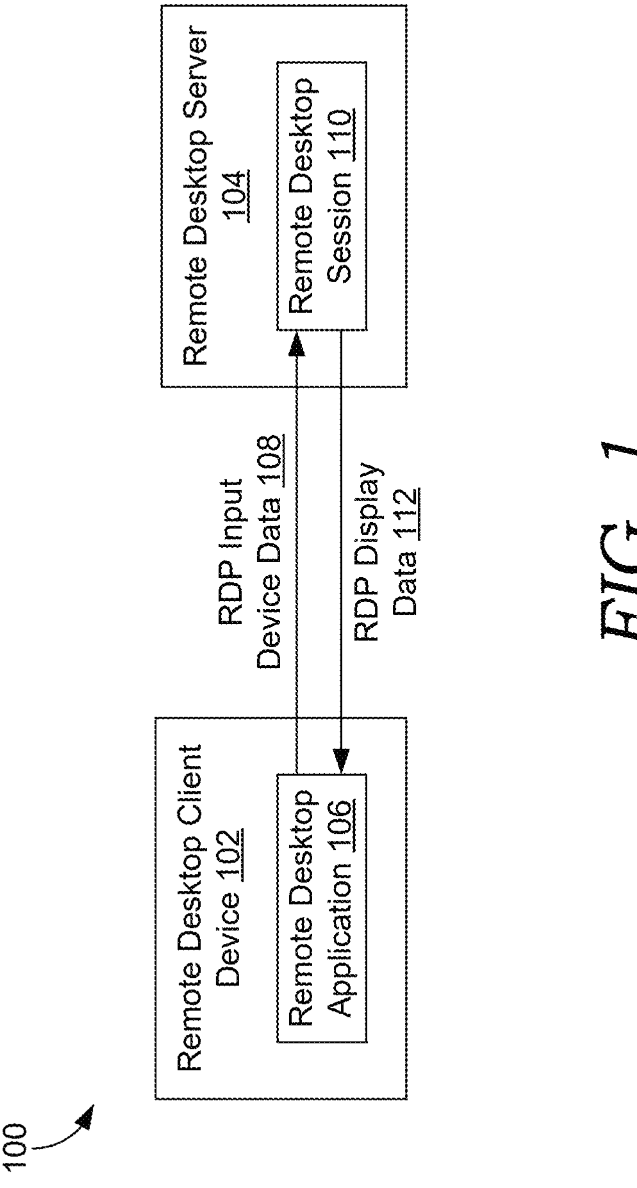
FIG. 1 is a block diagram illustrating an example operation of a remote desktop environment, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

Remote desktop services allow users to access and control a remote computer or virtual machine from another device. In this regard, users can connect to workstations, servers, or other computers remotely, thereby providing a virtual desktop experience. In this way, users can perform various tasks on a computing device as if physically present at the remote computer. Such various tasks may include, for example, running applications, accessing files, managing settings, and performing administrative tasks.

Generally, in conventional implementations, a client device includes a remote desktop application that is used to communicate with a remote desktop server via a terminal service executing at the remote desktop server. In establishing a connection between the remote desktop application of the client device and the terminal service of the remote desktop server, a remote desktop protocol (RDP) stack is initiated at the remote desktop server. In a remote desktop environment, RDP technology is utilized to enable efficient communication between the client device and the remote desktop server. The RDP stack facilitates the RDP communication between the client device and the remote desktop server. For example, the RDP stack can manage how data is packaged, transmitted, and/or received during remote desktop sessions. The RDP stack may also perform session management (e.g., authentication, encryption, and connection negotiation between the client device and the remote desktop server) and input/output management (e.g. transmission of user input from the client device to the remote desktop server and delivery of output from the remote desktop server to the client device).

In addition, in conventional implementations, the RDP stack of the remote desktop server generally encodes data to transmit to the client device. For example, the RDP stack may use various encoding techniques to encode graphical data prior to transmitting the data from the remote desktop server to the client device. In operation, a video driver obtains graphical data from an operating system of the remote desktop server. Such graphical data may include, for example, information about graphics, GUI elements, video data or content, or other graphical data to display at the client device. In accordance with obtaining data, such as graphical data, the video driver processes the data and generates the appropriate output for display at the client device. For example, the video driver may perform format conversion, scaling, color space conversion, and/or optimization for the target display (e.g., in accordance with capabilities and specifications of the client device). In this way, the video driver may interact with the operating system to generate graphical output based on instructions received from applications and/or the operating system. The processed graphical data may be provided or accessible to the RDP stack, which then encodes the data and transmits the encoded data to the client device during a remote desktop session. In particular, the video driver, in some cases along with the user mode remote desktop protocol (UMRDP), is responsible for providing the unencoded data to the terminal service and, in particular, the RDP stack of the remote desktop server for encoding.

Performing data encoding at the RDP stack, however, uses an extensive amount of CPU and memory resources. In particular, encoding data outside of the data acquisition process (also referred to as the driver process) results in CPU and memory resources being unnecessarily used to provide the raw data to the RDP stack of the terminal service. For example, a video driver may obtain megabytes of unencoded data, which is then passed to the RDP stack for encoding to compress the data before it is transmitted over the network to the client device. To provide the unencoded data to the RDP stack, the unencoded data is synchronized and copied between the video driver (or the data acquisition process) and the RDP stack (or the data transmission process). Synchronization and copying of data uses an extensive amount of CPU and memory resources, particularly when raw data is synchronized and copied. Such an extensive use of CPU and memory resources to perform data synchronization and copying between the two processes to perform data encoding via the RDP stack is exacerbated as monitor resolutions increase. For example, High Dynamic Range (HDR) monitors have eight bytes per pixel to provide various properties. Although eight bytes per pixel facilitates a richer display experience, it is double the amount of bytes per pixel of traditional monitors. As such, in instances in which HDR monitors are used, the amount of memory and CPU usage required to provide the data to the RDP stack to perform the encoding process is doubled. By way of example only, assume a traditional monitor resolution is 1024 by 768 pixel resolution. In such a case, the amount of memory used would be 1024 by 768 by 4 to accommodate information for each pixel. As another example, a traditional 4 k monitor may result in memory use of 3300 by 2700 by 4 to accommodate information for each pixel. In contrast, for an HDR monitor, the multiplier would be 8 instead of 4 to provide the associated information for each pixel.

System and memory utilization are further exacerbated in cases in which multiple HDR monitors are used. For example, an RDP server may handle multiple remote desktop sessions at the same time. As such, the amount of system and memory utilization increases as the number of active sessions that include an HDR monitor increases. As another example, a remote desktop session may include multiple HDR monitors. In this example, the amount of system and memory utilization also increases as the number of HDR monitors increases. Due to this extensive amount of system and memory utilization associated with HDR monitors, remote desktop environments may be unable to support HDR monitors or do so in a compromised manner.

With the increased computing and memory utilization associated with HDR monitors, to effectively and efficiently encode data to facilitate implementation of HDR display technology in a remote desktop environment, the present techniques perform data encoding in association with the video driver, thereby enabling data encoding to occur in the same process as obtaining the unencoded (e.g., raw) data. In this way, rather than synchronizing and copying the unencoded data to the RDP stack for encoding before transmitting to a client device, the unencoded data is obtained at the video driver and encoded in association therewith. The encoded data can then be provided to a terminal service, such as the RDP stack, for transmitting to the client device.

As described herein, in some embodiments, a video encoding manager and/or an HDR video encoder associated therewith may be initialized in association with the video driver to perform the data encoding. Further, the video encoding manager and/or an HDR video encoder associated therewith may perform tasks related to an internal protocol to communicate the encoded data to the RDP stack. As such, the video driver can operate as a pure or generic driver, without directly performing data encoding and/or data encapsulation (e.g., in a format suitable to transmit the data to the RDP stack). Accordingly, in embodiments described herein, the video driver is configured to provide unencoded graphical data to a video encoding manager, which can then facilitate data encoding (e.g., via an HDR video encoder) and/or data encapsulation. In this way, data encoding and/or data encapsulation is performed in association with the video driver, but logically separated therefrom.

In operation, to facilitate graphical data encoding and/or data encapsulation in association with a video driver, or data acquisition process, the video driver may obtain an encoding indicator. As used herein, an encoding indicator generally indicates or provides an instruction related to graphical data encoding. An encoding indicator may include a video encoding manager identifier and/or a video encoder identifier. In embodiments, an RDP stack may provide the encoding indicator to the video driver, for example, via Input/Output Control (IOCTL). The encoding indicator may instruct the video driver to load a particular video encoding manager and/or HDR video encoder (e.g., using a video encoding manager identifier and/or a video encoder identifier, respectively). In embodiments, the video encoding manager is loaded on top of the video driver in the same data acquisition process as the video driver. The video driver can communicate with the video encoding manager and/or video encoder via an encoding interface. The encoding interface enables separation of the video driver from the data encoding performed in association with the video encoding manager and/or video encoder.

Further, to facilitate implementation of HDR display technology in a remote desktop environment, monitor configuration data is used to obtain suitable content and/or perform graphical data encoding (e.g., via HDR video encoder). In particular, the video driver may obtain monitor configuration data for use in establishing HDR virtual monitors. In this way, the video driver may obtain graphical data (e.g., surface) associated with 8 bytes per pixel, as opposed to 4 bytes per pixel used for traditional monitors. The 8 bytes per pixel rate enables each pixel to be represented using 8 bytes of data, allowing for more complex and high-fidelity representations of images. For instance, each pixel in an HDR image may be represented using 8 bytes of data (or more) to accurately capture color, luminance, and/or other properties. Additionally or alternatively to obtaining the monitor configuration data, the video driver may provide the monitor configuration data to the HDR video encoder for use in encoding graphical data.

In operation, monitor configuration data is obtained at the RDP stack and provided to the video driver. The monitor configuration data may then be used to initiate, establish, or set a virtual monitor associated with the HDR monitor indicated in the monitor configuration data. In this regard, the operating system, or other component, may recognize that the remote desktop client device can support HDR graphical data for a remote desktop session. As such, the video driver can obtain suitable graphical data in the form of 8 bytes per pixel (as opposed to 4 bytes per pixel). As such, new frames (e.g., including a surface(s)) with the HDR format of 8 bytes per pixel are provided from the video driver to the HDR video encoder for encoding, such that the remote desktop client device can be provided with graphical data that can be projected or displayed in accordance with HDR display technology. A surface generally refers to an area or space where graphics are rendered or displayed.

Advantageously, performing data encoding in association with the video driver, as described herein, minimizes CPU and memory utilization, in comparison to performing data encoding via the RDP stack. For example, CPU and memory utilization to synchronize and copy data between the video driver and the RDP stack may be minimal to none in accordance with embodiments described herein. Further, separating encoding from the RDP stack facilitates a more secure implementation. For instance, as a data acquisition or driver process is a session specific process, there is more isolation and reliability in instances of errors during encoding (e.g., does not result in the terminal service disconnecting all active user sessions). Logically separating data encoding and/or data encapsulation from the video driver enables the video driver to perform more efficiently. Further, logically separating data encoding from the video driver enables secure and efficient updates in association with video encoders. For example, video encoders may be added or modified in association with the video encoding manager without impacting the video driver. In these ways, the technology described herein facilitates improved implementation of HDR display technology in a remote desktop environment.

Additionally, managing and utilizing monitor configuration data facilitates an effective display of content via HDR display technology. For example, monitor configuration data is used to obtain suitable content and/or perform graphical data encoding (e.g., via HDR video encoder). In this way, new frames (e.g., including a surface(s)) with the HDR format of 8 bytes per pixel may be obtained for processing (e.g., by the video driver) and provided to the HDR video encoder for encoding. Accordingly, the remote desktop client device can be provided with graphical data that can be projected or displayed in accordance with HDR display technology, providing a more desirable HDR display technology experience (e.g., a more realistic and visually appealing viewing experience).

Overview of Exemplary Environments for Facilitating Implementation of High Dynamic Range Display Technology in a Remote Desktop Environment As described, a user may desire to access computing applications remotely, e.g., applications that are running on a separate computing device. In this regard, a remote desktop environment or service may be used to provide a user with such access. A remote desktop environment or service includes a computer system that maintains applications that can be remotely executed by client computer systems. Input is entered at a client computer system and traversed over a network (e.g., using protocols based on the International Telecommunications Union (ITU) T.120 family of protocols such as Remote Desktop Protocol (RDP)) to an application on a server, such as remote desktop server or terminal server. The application processes the input as if the input were entered at the server.

FIG. 1 provides a diagrammatic overview of the operation of a remote desktop environment 100. The remote desktop environment 100 includes a remote desktop client device 102 and a remote desktop server 104. Remote desktop client device 102 can be a client device on a client-side of remote desktop environment 100, while remote desktop server 104 can be on a server-side of remote desktop environment 100. Remote desktop server 104 may comprise server-side software designed to work in conjunction with client-side software on remote desktop client device 102 so as to implement any combination of the features and functionalities discussed in the present disclosure. The remote desktop environment 100 shown in FIG. 1 is an example of one suitable environment and is not intended to suggest any limitation as to the scope of use or functionality of embodiments disclosed throughout this document. Neither should the exemplary remote desktop environment 100 be interpreted as having any dependency or requirement related to any single component or combination of components illustrated therein. For example, any number of remote desktop client devices 102 and/or remote desktop servers 104 may exist within a remote desktop environment 100. For instance, multiple remote desktop client devices 102 may communicate with the remote desktop server 104.

A remote desktop client device 102 and a remote desktop server 104 can communicate through a network, which may include any number of networks, such as, for example, a local area network (LAN), a wide area network (WAN), the Internet, a cellular network, a peer-to-peer (P2P) network, a mobile network, or a combination of networks. In embodiments, the remote desktop client device 102 and the remote desktop server 104 communicate using remote desktop protocol (RDP). Although illustrated and discussed as using RDP for communication, any remote access protocol may be used to enable the remote desktop client device 102 to connect to remote desktop server 104. Other examples of remote access protocol include, but are not limited to, Secure Shell (SSH), Virtual Network Computing (VNC), and Team Viewer.

The remote desktop client device 102 can be any kind of computing device capable of facilitating a remote desktop session. For example, in an embodiment, the remote desktop client device 102 can be a computing device such as computing device 700, as described below with reference to FIG. 7. In embodiments, the remote desktop client device 102 can be a personal computer (PC), a laptop computer, a workstation, a mobile computing device, a PDA, a cell phone, or the like.

In one embodiment, the remote desktop client device 102 may include HDR capabilities. HDR capabilities generally refer to the ability of a device (e.g., remote desktop client device 102) to process and display HDR content. A device having HDR capabilities can generally support HDR content playback and often includes features, such as HDR decoding, tone mapping, and color reproduction enhancements. HDR content generally refers to multimedia content, such as images, videos, or games, that is encoded or created with enhanced dynamic range compared to standard dynamic range (SDR) content. For example, HDR content may be created with a wider range of luminance levels, allowing for brighter highlights, deeper shadows, and more detail in both bright and dark areas of the image or video. HDR content may use a wider color gamut compared to SDR content, allowing for more vibrant and accurate reproduction of colors. HDR content may use a higher bit depth such that it can represent more shades of color and luminance compared to SDR content. Additionally, HDR content may be accompanied by metadata that specifies its HDR parameters, such as peak brightness levels, color gamut, and mastering display characteristics.

The remote desktop client device 102 may include or be in communication with an HDR monitor (not shown). An HDR monitor may be a display device designed and/or optimized to meet requirements of HDR content. Generally, an HDR monitor features specialized hardware and technology to attain higher peak brightness levels, wider color gamuts, and better contrast ratios compared to standard dynamic range (SDR).

The remote desktop client device 102 can include one or more processors, and one or more computer-readable media. The computer-readable media may include computer-readable instructions executable by the one or more processors. The instructions may be embodied by one or more applications, such as remote desktop application 106 shown in FIG. 1. The application(s) may generally be any application capable of facilitating a remote desktop session(s). In some implementations, the application(s) comprises a web application, which can run in a web browser, and could be hosted at least partially server-side (e.g., via a server). In addition, or instead, the application(s) can comprise a dedicated application. In some cases, the application is integrated into the operating system (e.g., as a service).

The remote desktop client device 102 is generally operated by an individual or entity that initiates a remote desktop session. In this way, an individual may desire to access and interact with a computer or desktop environment remotely (e.g., over a network connection). In a remote desktop session, a user's inputs (e.g., mouse movements, keyboard inputs, touch gestures, and the like) are transmitted to the remote desktop server 104, and the graphical output of the remote desktop server 104 is provided to the remote desktop client device 102.

In operation, the remote desktop client device 102 runs a remote desktop application 106 that sends remote desktop protocol (RDP) input device data 108, such as for example keyboard data and mouse click data, to a remote desktop session 110 that has been spawned in the remote desktop server and receives RDP display data 112, such as user interface graphical data. Generally, the remote desktop application 106 is a thin client process and most processing is provided on the remote desktop server 104.

When a remote desktop client device connects to a remote desktop server via a remote desktop server gateway (not shown), the gateway may open a socket connection with the remote desktop server and redirect client traffic on the RDP port or a port dedicated to remote access services. The gateway may also perform certain gateway specific exchanges with the client using a terminal servicer gateway protocol transmitted over HTTPS.

During the remote desktop session 110, an application running in the session generates output in response to the received input 108, and the output 112 is transferred over the network to the remote desktop client device 102. The remote desktop client device 102 runs a remote desktop application 106 that presents the output data. Thus, the input is received and output presented at the remote desktop client device 102, while processing actually occurs at the remote desktop server 104. A session can include a shell and a user interface such as a desktop, the subsystems that rack mouse movement within the desktop, the subsystems that translate a mouse click on an icon into commands that effectuate an instance of a program, or the like. It should be understood that the foregoing discussion is exemplar and the presently disclosed embodiments may be implemented in various client/server environments and not limited to a particular remote desktop services product. One example of remote desktop system is Remote Desktop Services provided by Microsoft® Corporation.

Figure 2:
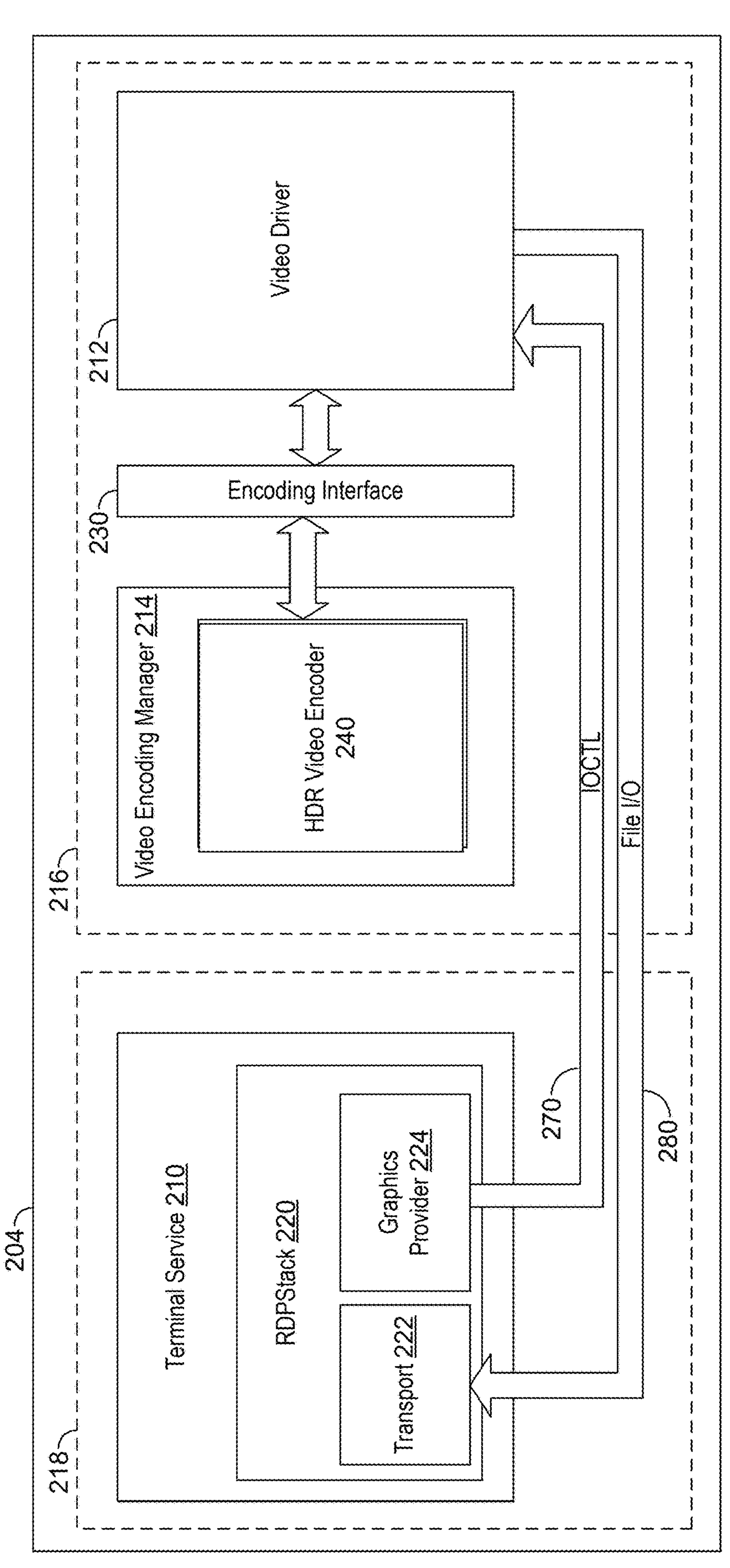
FIG. 2 provides an example remote desktop server that facilitates implementation of HDR display technology in remote desktop environment, in accordance with aspects of the technology described herein.

FIG. 2 provides an example remote desktop server that facilitates efficient and effective implementation of HDR display technology in a remote desktop environment. As illustrated in FIG. 2, the remote desktop server 204 facilitates implementation of HDR display technology in a remote desktop environment. In particular, the remote desktop server 204 obtains and effectively utilizes monitor configuration data associated with a monitor(s) of the remote desktop client device. Further, graphical data encoding is performed separately from the terminal service 210, thereby performing data encoding for HDR technology in a more effective and efficient manner. In particular, graphical data is encoded in association with the video driver 212 (e.g., via the video encoding manager 214 and/or HDR processor 240) before being communicated to the terminal service 210. In this way, graphical data encoding is performed in association with the data acquisition process components 216 (or driver process), which is separate from the session managing process components 218 (or RDP stack process). The data acquisition process components 216 is generally configured to acquire graphical data, for example, via the operating system, application, and/or the like. The session managing process components 218 is generally configured to manage remote desktop sessions, including performing user authentication, session creation, session management, and data transmission between a remote desktop client device and the remote desktop server 204 during remote desktop sessions. The session managing process components 218 may operate at the application layer, while the data acquisition process components 216 may operate at a different layer level (e.g., a lower level) than the session managing process components.

In operation, a remote desktop client device may communicate with the remote desktop server 204 via a remote desktop application operating on the remote desktop client device. In particular, the remote desktop client device, via the remote desktop application (e.g., remote desktop application 106 of FIG. 1), may connect with the terminal service 210 running on the remote desktop server 204. In this regard, the remote desktop application may initiate and communicate a connection request to initiate a remote desktop session. A connection request may be initiated in a number of ways. For example, in some cases, a connection request may be initiated based on the remote desktop application (e.g., 106 of FIG. 1) being launched. In other cases, a connection request may be initiated based on a user selection via the remote desktop application. In some cases, in accordance with initiating the connection request, communication between the remote desktop client device (e.g., 102 of FIG. 1) and the remote desktop server 204 may be exchanged to perform authentication (e.g., verifying username and password of user), among other things.

In accordance with a successful authentication, a connection is established between the remote desktop client device and the remote desktop server 204. Establishing a connection may include, for example, negotiating protocol versions, security settings, and/or other parameters to ensure a stable and secure connection between the remote desktop client device and the remote desktop server 204. For example, the remote desktop client device and the remote desktop server 204 may negotiate connection parameters and establish a secure communication channel using the RDP that encrypts the data exchanged between the remote desktop client device and the remote desktop server 204.

In embodiments, the remote desktop client device may communicate monitor configuration data to the terminal service 210 of the remote desktop server 204. In some cases, the monitor configuration data may be communicated to the remote desktop server 204 during or following the connection initialization phase. As such, monitor configuration data may be communicated before, during, and/or after the remote desktop session is established. Monitor configuration data generally refers to data associated with the configuration of a display device(s) associated with the remote desktop client device. For example, monitor configuration data may include data associated with various display device parameters, such as resolution, color depth, supported refresh rates, and/or other display parameters. Providing monitor configuration data to the remote desktop server 204 enables the server to adapt display output to match or align with the capabilities of the remote desktop client device. As such, the remote desktop session may be displayed correctly on the remote desktop client's display screen, taking into account attributes such as screen resolution, color depth, and multiple monitor configurations. As the remote desktop client device may include or be associated with multiple monitors, the monitor configuration data may correspond with multiple monitors.

Monitor configuration data is generally determined at the remote desktop client device based on characteristics and capabilities of the display devices connected to or associated with the remote desktop client device. The monitor configuration data may be obtained from the display device(s) or monitor(s), for example, using a standard protocol of Extended Display Identification Data (EDID). In this way, the remote desktop client device may extract EDID from each corresponding display device (e.g., monitor) or the display device may communicate its capabilities to the remote desktop client device via the EDID protocol. For example, the display device may provide a data structure in the form of an EDID block containing monitor configuration information such as supported resolution, refresh rates, color capabilities, aspect ratio, and other display parameters. In some cases, the EDID data is structured as a binary blob, which may include a series of bytes organized into specific data blocks. Each data block may include information about different aspects of the display device, such as supported resolutions, refresh rates, color formats, aspect ratios, and/or manufacturer details.

In some embodiments, the operating system of the remote desktop client device may obtain the EDID information from a connected display device(s) and make it available to applications and/or services (e.g., remote desktop client application(s)) running on the remote desktop client device. In some cases, the operating system or the remote desktop client application may use the obtained EDID to determine or derive the monitor configuration data. For example, only a portion of the EDID may be communicated. As another example, EDID information may be parsed and sent in a different format. In other cases, the operating system or the remote desktop client application may extract the EDID data and encapsulate it into a binary blob for transmission to the remote desktop server. In this regard, the entire EDID may be communicated as a binary blob.

The remote desktop client device may then provide such monitor configuration data (e.g., EDID blob or a representation or derivation thereof) to the terminal service 210. In some cases, the monitor configuration data may be provided as part of the connection request sent to the remote desktop server.

In embodiments, the monitor configuration data may be provided to the terminal service 210 via RDP. As can be appreciated, monitor configuration information (e.g., obtained via EDID) for an HDR monitor may include additional information compared to a standard monitor. For example, HDR monitors may support a higher color depth (e.g., 10 bits per channel or more), allowing for more distinct colors to be displayed. HDR monitors may display a wider range of luminance levels. HDR content may include metadata that describes how to display content. HDR monitors may also support wider color spaces that can display more colors than a standard sRGB color space. Such data may be additionally included as monitor configuration information, thereby resulting in a richer set of data. Further, the types and formats of data may vary depending on the monitor and/or an HDR standard it supports (e.g., HDR10, HDR10+, Dolby Vision, HLG.).

As such, to accommodate the additional monitor configuration data associated with an HDR monitor, the RDP protocol that may be used to communicate the monitor configuration may be adjusted to accommodate or support the additional data. For example, in conventional implementations, the RDP may include a limit of 4 blocks of 128 bytes (512 bytes) per monitor for communicating monitor configuration data. As monitor configuration data associated with an HDR may exceed such a size limit, the RDP may be adjusted to support a greater size limit that is suitable for conveying monitor configuration information (e.g., via an EDID blob or representation thereof). In this regard, the RDP may be adjusted to increase the monitor configuration data size or eliminate any monitor configuration data size limit.

Although generally described herein as using EDID, other data formats may additionally or alternatively be used to obtain and/or provide monitor configuration data. For example, in some embodiments, Display Identification Data (DisplayID) may be used. DisplayID is an alternative to EDID and provides similar functionality. DisplayID uses a more flexible and extensible data structure compared to EDID, thereby allowing for a more detailed and comprehensive display information to be communicated. DisplayID also supports higher resolution, refresh rates, and color depths. Further, DisplayID supports dynamic configuration changes, enabling display devices to update their capabilities and settings dynamically based on changes in the display environment or user preferences.

Upon establishing the connection, the terminal service 210 may facilitate initializing a new remote desktop session for the authenticated user. Initializing a remote desktop session may include setting up the user's desktop environment, preparing the display, and/or loading necessary resources for the remote desktop session.

In accordance with initializing the remote desktop session, graphical data can be rendered for display on the remote desktop client device. In this regard, and at a high level, graphical output generated by applications running on the remote desktop server are captured and encoded for transmission to the remote desktop client device. The remote desktop client device receives the encoded graphical data and renders it on the local display. In this way, the user may be provided with control over the remote desktop, which is now an active remote desktop session within the operating system. The user can interact with the desktop environment, launch applications, access files, and perform tasks as if the user was physically present at the remote desktop server 204. In accordance with such interactions, the remote desktop client device may provide or transmit GUI elements, keyboard input, mouse movements, and/or other user interactions between the client device and remote server.

With respect to the remote desktop server 204, the remote desktop server 204 includes a terminal service 210, a video driver 212, and a video encoding manager 214. As shown, the terminal service 210 corresponds with the session managing process components 218, which is generally configured to manage remote desktop sessions including performing user authentication, session creation, session management, and data transmission between the client and server during remote desktop sessions. The video driver 212 and the video encoding manager 214 correspond with the data acquisition process components 216, which is generally configured to manage data acquisition (e.g., acquire and encode data). In this regard, the data acquisition process components 216 includes acquiring and encoding graphical data before the data is communicated to the terminal service 210.

The terminal service 210 communicates with the remote desktop client device (e.g., remote desktop client device 102 of FIG. 1) and manages remote desktop sessions. A remote desktop session generally refers to a period during which a user accesses and interacts with a remote desktop environment or applications on a remote computer from a client or local device. As can be appreciated, the terminal service 210 can manage multiple remote desktop sessions, for example, associated with multiple users.

The terminal service 210 includes an RDP stack 220, which may be loaded therein. The RDP stack 220 includes software components and protocols that implement and/or manage communication between a remote desktop client device and the remote desktop server 204 (e.g., using RDP). Although illustrated as an RDP stack, a remote access protocol stack of any configuration may be used.

The RDP stack 220 may be loaded at any time. In one embodiment, the RDP stack is loaded when a connection request is obtained, for instance, when a user attempts to initiate a remote desktop session. In another embodiment, the RDP stack is loaded when the terminal service 210 is loaded. For example, when the remote desktop server 204 boots and loads the core operating system, the terminal service 210 and the RDP stack 220 may be initiated or loaded. In accordance with initializing the RDP stack 220, the RDP stack 220 listens for incoming data, such as connection requests, for example, from a remote desktop client device(s) and manages the communication between a remote desktop client device(s) and the remote desktop server 204. For instance, in association with a connection request, the RDP stack 220 may perform various tasks, such as authentication and session management. In association with the connection process, the RDP stack 220 may obtain monitor configuration data from the remote desktop client device. Once negotiation is successful and the connection is established, the RDP stack facilitates data transport between the remote desktop client device and the remote desktop server 204. For example, the RDP stack 220 may interact with the video driver 212 to transmit graphical data from the virtual desktop to the display of the remote desktop client device.

In some embodiments, the RDP stack 220 may include a transport 222 and a graphics provider 224. The transport 222 and/or graphics provider 224 may be initiated or instantiated at any time. As one example, transport 222 and/or graphics provider 224 may be initiated in accordance with activation or initiation of the RDP stack 220 and/or a remote desktop session. For example, assume a user initiates a connection request to connect with the remote desktop server 204. In such a case, the RDP stack 220 may be initiated at the remote desktop server 204 when the remote desktop client device communicates a connection request. In this way, when a remote desktop client device initiates a connection to the remote desktop server 204, the RDP stack 220 may become active to handle the incoming connection request. As part of such an activation, the transport 222 and/or graphics provider 224 may be initialized.

The transport 222 is generally configured to manage data communication between a remote desktop client device and the remote desktop server 204. In this regard, when a remote desktop session is initiated (e.g., a user initiates a remote desktop session), the transport 222 manages communication, or data packet flow, between the remote desktop client device and the remote desktop server 204. The transport 222 may perform various tasks, such as packetization, encryption, compression, and/or ensuring reliable delivery of data (e.g., via packet acknowledgments, retransmissions, and/or flow control). The transport 222 can package the remote desktop protocol onto the underlying network protocol, such as Transmission Control Protocol (TCP) or User Datagram Protocol (UDP), for communication.

The graphics provider 224 is generally configured to facilitate display of graphical content on the remote desktop client device during a remote desktop session(s). In some cases, the graphics provider 224 may be a Universal Windows Platform Remote Desktop Protocol (UWRDP) graphics provider. In some embodiments, the graphics provider 224 may obtain graphical data for transmitting to the remote desktop client device. For example, and as described herein, encoded graphical data may be provided to the graphics provider 224 (e.g., from a video encoder 240). In cases in which the graphics provider 224 obtains encoded graphical data, the graphics provider 224 may provide the encoded graphical data to the transport 222 for transmission over the network. In this way, the graphics provider 224 may manage efficient transmission of graphical data, such as screen updates, images, and video, between a remote desktop client device and the remote desktop server 204. As described herein, in conventional implementations, a graphics provider may encode graphical data generated on the remote desktop server before the data is transmitted to the remote desktop client device. In particular, a graphics provider may acquire unencoded graphical data from a video driver and encode the graphical data. In accordance with implementations described herein, however, the graphical data is encoded in association with the data acquisition process (e.g., via the video encoding manager 214) and, as such, is not encoded in association with terminal service 210 (e.g., the RDP stack or the graphics provider). Accordingly, although the graphics provider 224 is illustrated, in some embodiments, the graphics provider 224 is not implemented and/or used.

As described, the terminal service 210 manages remote desktop sessions. In particular, the terminal service 210 may initiate a remote desktop session upon obtaining or receiving a connection request and/or establishing a connection. For example, in obtaining a connection request, the terminal service 210 may instruct the operating system of the remote desktop server 204 to initiate or start a remote desktop session (e.g., upon authentication). As such, the operating system of the remote desktop server 204 can initiate a remote desktop session in response to such an instruction from the terminal service 210. In initiating a remote desktop session, a video driver 212 is activated (e.g., via the operating system). The video driver 212 may interact with the operating system and capture the graphics or video output associated with the remote desktop session. In this regard, in initiating a remote desktop session, a video driver is activated to capture graphical information, which can be transmitted back to the client via the terminal service 210.

To facilitate graphical data encoding and/or data encapsulation in association with a video driver, or data acquisition process components, the terminal service 210 may generate and/or provide an encoding indicator to the video driver. As used herein, an encoding indicator generally indicates or provides an instruction related to graphical data encoding. An encoding indicator may include a video encoding manager identifier and/or a video encoder identifier. In embodiments, the terminal service 210 may provide (e.g., via the RDP stack) the encoding indicator to the video driver via input/output control (IOCTL). In this way, an IOCTL interface may be used to communicate with the video driver. The encoding indicator may instruct the video driver to load or utilize a particular video encoding manager and/or video encoder (e.g., using a video encoding manager identifier and/or a video encoder identifier, respectively).

The particular video encoding manager identifier and/or video encoder identifier to provide in association with an encoding indicator may be identified or determined in any number of ways. In some cases, the encoding manager identifier and/or video encoder identifier may be provided by the remote desktop client device. For example, the remote desktop client device, the remote desktop client application, and/or the user may indicate or specify a particular video encoding manager identifier and/or video encoder identifier to use. In other cases, the remote desktop server 204 (e.g., via the terminal service 210) may determine a particular encoding manager identifier and/or video encoder identifier. The particular video encoding manager and/or video encoder may be based on the type of remote desktop client device (or attributes associated therewith, such as resolution of the monitor), the type of data, the user, computational efficiency of the video encoder, and/or any other attribute or factor. In accordance with embodiments described herein, the video encoder identifier may identify HDR video encoder 240 to use for performing video encoding in association with HDR display technology.

To facilitate implementation of HDR technology, the terminal service 210 may communicate monitor configuration data to the video driver 212. In this regard, the RDP stack 220 may communicate the monitor configuration data (e.g., obtained from a remote desktop client device) to the video driver 212. In some cases, the monitor configuration data is provided to the video driver 212 via IOCTL. The RDP stack 220 may translate obtained monitor configuration data into a different format, for instance in the form of IOCTL, that is understandable by the video driver 212.

By way of example only, monitor configuration data may include data related to various parameters including a configuration mode, a display mode, a scale factor, a physical size, a colorimetry, a SDR white level, a monitor description, and/or container information. A configuration mode may refer to a specific configuration or preset that describes how the monitor processes and displays content. This can include different color profiles, brightness settings, and HDR modes (e.g., HDR10, Dolby Vision). A display mode may refer to the overall display configuration or operating mode of the monitor, such as, for example, settings such as resolution, refresh rate, aspect ratio, and orientation. In the context of HDR monitors, the display mode may also include parameters specific to HDR content playback, such as HDR brightness levels, and color space settings. A scale factor may refer to a multiplier applied to a size of graphical elements on the screen, for example, to accommodate different display resolutions or dots per inch settings. The scale factor may also indicate how content is displayed or rendered on the screen, such as when scaling between different resolutions or aspect ratios. Physical size may refer to the dimensions of the monitor screen (e.g., represented in inches or centimeters). Physical size of the monitor allows for accurate calibration and adjustment of viewing distances, as well as ensuring that content is displayed correctly across different display devices. Colorimetry may refer to measurement of color, including parameters such as color temperature, color space, and color accuracy. In HDR monitor configuration data, colorimetry information may include details about the monitor's color space coverage (e.g., DCI-P3, Rec. 2020), white point settings, gamma curve, and calibration profiles. This information helps ensure that colors are reproduced accurately and consistently on the monitor. SDR white level may refer to the standard luminance level used for displaying white in Standard Dynamic Range (SDR) content. In HDR monitor configuration data, specifying the SDR white level ensures compatibility with legacy SDR content by defining the target brightness for white. This parameter helps maintain consistency when switching between HDR and SDR content on the same monitor. Monitor description may include detailed information about the monitor's specifications, features, and capabilities. For example, monitor description may indicate the manufacturer, model name, serial number, supported resolutions and refresh rates, connectivity options, HDR compatibility, and other relevant details, Monitor descriptions help users identify and configure their monitors correctly within operating systems and software applications. Container information may refer to metadata or information embedded within multimedia container formats (e.g., MP4, MKV) that describes the characteristics of the video content, including HDR metadata. In the context of HDR monitor configuration data, container info may include details about the HDR format used (e.g., HDR10, Dolby Vision), color space information, mastering display characteristics, and other parameters necessary for accurate rendering of HDR content on compatible monitors.

As described, the data acquisition process components 216 generally performs data acquisition. That is, the data acquisition process components 216 may obtain graphical data and provide graphical output (e.g., images or visual outputs) that can be displayed on a display screen. In accordance with embodiments described herein, the data acquisition process components 216 is performed using the video driver 212 and the video encoding manager 214. At a high-level, the video driver 212 obtains graphical data and performs graphics processing, and the video encoding manager 214 manages encoding of the graphical data.

The video driver 212 is generally configured to obtain graphical data and, in some cases, process such data. To do so, the video driver 212 may communicate with the operating system and the graphics hardware (e.g., GPU) to manage graphics rendering and display management. In this way, the video driver 212 may facilitate communication between software and the display hardware.

In advance of obtaining graphical data, the video driver 212 may configure a virtual monitor(s) for a remote desktop session. A virtual monitor generally refers to a simulated display device that exists within the software framework of the remote desktop client or server. Virtual monitors may be created to provide customer display setups, tailored to preferences and/or requirements. A virtual monitor may be created and managed within the remote desktop software. For example, the video driver may communicate with the operating system to create the virtual monitor, including registering the virtual monitor with the operating system and providing an interface for rendering graphics to the virtual monitor. In embodiments, a virtual monitor(s) may be configured using the obtained monitor configuration data. In this way, as monitor configuration data is obtained, the video driver may use such data, or a portion thereof, to configure one or more virtual monitors (e.g., in association with the monitor configuration data).

Configuring a virtual monitor may facilitate understanding of the capabilities of the remote desktop client device. In particular, in setting up or configuring a virtual monitor, the virtual monitor can be configured to emulate various display capabilities, such as HDR capabilities. This allows the operating system and/or other applications or components of a remote desktop server to behave as if interfacing with a real monitor that supports these features. The operating system and/or applications or components may understand and take advantage of the remote desktop client device's display capabilities. For example, configuring a virtual monitor can provide information to the operating system such that the operating system understands capabilities (e.g., HDR capabilities) associated with the remote desktop client device. In this regard, in cases in which the monitor configuration data indicates HDR capabilities, the operating system, or other components of the remote desktop server 204, may recognize that the remote desktop client can support a specific type of video data, such as HDR video data.

In some cases, the virtual monitor may be created based on the monitor configuration data. In such a case, the monitor configuration data may at least include a display mode, a scale factor, and a physical size such that the virtual monitor can be created in accordance therewith. In other cases, a virtual monitor may be updated based on the monitor configuration data. Such monitor configuration data may be of any type or amount. Various examples of types of configuration data may include configuration mode, display mode, scale factor, physical size, colorimetry, SDR white level, monitor description, container information, and/or the like.

In embodiments, the video driver 212 may obtain or identify the monitor configuration data for use in establishing or setting a virtual monitor. As one example, the video driver 212 may parse an EDID blob, or representation thereof, and extract monitor configuration data, such as display resolution, refresh rate, color depths, and/or other parameters supported by the corresponding monitor.

In accordance with generating a virtual monitor or updating a virtual monitor, the virtual monitor (or an indication of its existence) and/or configurations associated therewith may be provided to the operating system, GPU, or other component of the remote desktop server. Providing such information enables the operating system, GPU, or other component(s) to recognize the data (e.g., video data) the remote desktop client device can support. For example, assume the virtual monitor is configured to support HDR capabilities. In such a case, providing configurations indicating HDR capabilities to the operating system and GPU enables recognition that the remote desktop client device can support HDR video data.

In some embodiments, the video driver 212 facilitates rendering of visual content (e.g., images) for display on the screen. As such, the video driver 212 may translate high-level graphics commands into instructions that the GPU or CPU can understand and execute. Such instructions may relate to colors, positions, transformations, layout details, or the like. In this way, the video driver 212 may communicate or interface with a graphics subsystem (e.g., GPU and/or CPU), which performs the rendering, to ensure correct display on monitors. For example, the GPU may process the rendering instructions provided by the video driver and generate actual pixel data for the final image. Such data may include the rendered frame, which includes pixel values representing color, depth information, and any additional rendering effects applied during the process (e.g., lighting, shadows, anti-aliasing). The rendered frame, or a surface(s), is the visual output of the rendering process, representing what the user may view on the screen. The rendered data (e.g., frame(s)) can then be returned to the video driver 212 for processing and/or communicating, for example, to the video encoding manger 214. For example, the video driver may take the rendered frame data (e.g., via a frame buffer) and prepare it for display (e.g., performing color space conversion, scaling, gramma correction, and/or other adjustments to ensure compatibility with the display hardware and settings). The graphical data (e.g., in the form of the rendered output or data processed therefrom) may then be communicated from the video driver (e.g., to the video encoding manager). The video driver 212 may perform various functionalities, such as, for example, creating the graphics adapter representing the indirect display device; reporting connected and disconnected monitors; providing descriptions of connected monitors and available display modes; supporting other display functionality like hardware mouse cursor, gamma, I2C communications, and protected content; handling the desktop image processing for display; and implementing UMDF functionality such as device communications, power management, and plug-and-play technology.

As described, various components of the remote desktop server 204 may use the virtual monitor configurations to render visual content. In some examples, the operating system and/or the GPU are used to render data. The operating system may recognize the virtual monitor as a display device and include the virtual monitor in its display configuration alongside physical monitors. A graphical user interface environment (e.g., windowing systems, such as Windows, macOS, or X11) may manage the placement and rendering of graphical elements on the virtual monitor. The operating system may recognize the virtual monitor as an independent display surface, allowing applications to render their content to it using standard graphics APIs (such as DirectX or OpenGL). The GPU may perform the rendering of graphical data for the virtual monitor. Graphics commands may be communicated to the GPU, specifying what needs to be rendered on the virtual monitor. These commands may be processed by the GPU, which may perform necessary calculations and render the final images. The GPU may interact with the virtual display buffer associated with the virtual monitor, and the rendered graphics data may be written to this buffer. The GPU can ensure that the rendered content conforms to the specifications of the virtual monitor, including its resolution, color depth, refresh rate, and other HDR-related data. The operating system and GPU may continue to render and update the content of the virtual monitor as needed, ensuring that the remote desktop client device receives an accurate representation of the virtual monitor's display.

In accordance with embodiments described herein, using the virtual monitor configurations, the GPU may prepare the graphical data in an HDR format that represents eight bytes per pixel. The GPU may process graphics commands, such as commands related to rendering 3D scenes, drawing 2D graphics, or composing graphical elements for display. As part of such processing, the GPU may convert graphical data into a format suitable for rendering and display. In this regard, the GPU may process rendering commands, taking into account the HDR settings of the virtual monitor. For example, the GPU may perform color space conversion, pixel format conversion, and/or texture mapping. In this regard, the GPU may process and prepare graphical data, including organizing pixels, as part of the graphics rendering pipeline. For instance, the GPU may perform calculations to accurately represent the wide color range and luminance levels of HDR content. For HDR data, the pixels may be organized with 8 bytes (or greater) per pixel to represent higher dynamic range and color depth characteristic of HDR images. As such, the HDR data may include greater precision, thereby enabling more detailed representations of bright highlights and deep shadows, for example.

In one embodiment, the video driver 212 is in the form of an indirect display driver (IDD) or a remote desktop protocol indirect display driver (also referred to as RDPIDD). An IDD or RDPIDD is generally implemented in cases in which monitors are indirectly connected. An indirect display driver (IDD) is used when rendering occurs indirectly, such as when using remote desktop services. In particular, graphics rendering occurs at the remote desktop server, but the output is displayed on a local remote desktop client device. An IDD or a RDPIDD may serve as a user-mode driver for the indirect display device. In embodiments, an IDD or RDPIDD may create a graphics adapter representation for the indirect display, report connected and disconnected monitors, provide monitor descriptions and available display modes, or the like.

In some cases, a video driver 112 in the form of a RDPIDD operates within the framework provided by a Windows Device Driver Model (WDDM). Stated differently, the RDPIPP is a subsystem of the WDDM. The WDDM provides a standardized interface between display drivers (e.g., user-mode device drivers) and the operating system. In some cases, a video driver 212, such as a RDPIDD, is implemented via a public API (e.g., Independent Display Driver for Console Extensions (IDDcx)).

In some embodiments, a video driver 212, such as an IDD, is implemented as a dynamic link library (DLL). A DLL includes code and functions that facilitate tasks performed by the video driver 212, such as obtaining graphical output and managing display-related tasks within a remote desktop session.

In some embodiments, instantiation of a video driver 212 is initiated via the RDP stack 220. For example, the RDP stack may communicate with the operating system to initiate launching of a video driver for a remote desktop session and such information may be provided to a plug-and-play component to instantiate the video driver. In some cases, the video driver may be initiated, instantiated, or loaded via a user-mode driver framework (UMDF). In this regard, the video driver 212 may be referred to as a user-mode driver or UMDF driver. UMDF is a framework for developing user-mode drivers in a Windows operating system. User-mode drivers run in user space rather than kernel space. In some cases, when a device requires the UMDF driver is connected to the system, the plug-and-play subsystem of the operating system detects the device and identifies the corresponding or appropriate driver package. The plug-and-play subsystem can then initiate the device installation process. During the device installation process, the driver may be loaded into memory (e.g., via a UMDF loader component of the operating system). For example, the plug-and-play system may load or launch a Windows Graphic Foundation (WGF) host executable, which includes the video driver to initiate, download, or install. Once loaded into memory, the video driver is initialized, which may include executing the driver's entry point and initializing any data structures, resources, or runtime environments required by the video driver to function properly.

In accordance with embodiments herein, the video driver 212 obtains unencoded (e.g., raw) graphical data (e.g., rendered data). In some embodiments, unencoded graphical data is obtained from a rendering component (e.g., GPU and/or operating system) of the remote desktop server 204. The video driver 212 may capture unencoded graphical data from the rendering component for a particular session. For example, for a user at a remote desktop client device, the rendering component may provide data to the video driver 212 in association with the particular remote desktop session associated with the user. In some cases, the video driver 212 obtains unencoded graphical data by intercepting graphical data generated or output by a component running on the remote desktop server's environment. The unencoded graphical data may be obtained via a frame buffer in a real-time manner. In this way, graphical data may be obtained as the data is rendered. Such graphical data may include windows, icons, dialog boxes, and/or any other graphical element produced by applications. In some cases, the video driver 212 is also configured to manage various processing tasks, such as display-related tasks, within the remote desktop session. For example, the video driver 212 may manage tasks such as screen resizing, color depth adjustments, and cursor handling.

As described herein, in some cases, monitor configurations associated with HDR capabilities or HDR virtual monitor(s) may be provided to the operating system and/or other rendering component. In such a case, the graphical data obtained at the video driver 212 may be in the form of HDR video data for presentation to a remote desktop client device, as the graphical data may be rendered in accordance with the indicated HDR configurations. HDR graphical data may include image or video content that contains a wider range of brightness levels and color depth compared to standard dynamic range (SDR) content. In embodiments, the HDR graphical data is generated or rendered in a format that includes eight bytes per pixel.

In accordance with embodiments described herein, video encoding occurs in association with the video driver 212. In this way, in some embodiments, the video driver 212 may perform video encoding in association with the graphical data. Video encoding refers to the process of encoding graphical data, including video as well as other visual elements displayed in association with a remote desktop. For example, video encoding may include encoding various types of graphical data generated by applications running on the remote desktop server, such as text, images, icons, videos, windows, and other visual elements.

In other embodiments, the video driver 212 communicates with the video encoding manager 214, or portion thereof (e.g., a video encoder), to facilitate graphical data encoding. In particular, the video driver 212 may provide the unencoded graphical data (e.g., HDR graphical data) to the video encoding manager 214. In this way, the graphical data encoding occurs in association with the same data acquisition process components 216 and, as such, may avoid the synchronization and copying of the unencoded data to the RDP stack, as required in conventional implementations.

In some cases, the video driver 212 identifies or determines a video encoding manager 214 and/or video encoder 240 with which to communicate. In this regard, the video driver 212 may identify which video encoder manager 214 and/or video encoder 240 to provide graphical data for encoding. For example, in some cases, multiple video encoding managers 214 may exist (e.g., for different remote desktop sessions or for different users). As another example, multiple video encoders may exist in association with a video encoding manager (e.g., to perform different encoding techniques). A particular video encoding manager 214 and/or video encoder 240 may be identified in association with the video driver 212. For example, the video driver 212 may have a video encoding manager identifier and/or video encoder identifier hard coded to indicate a desired video encoder manager and/or video encoder. As another example, the video driver 212 may identify monitor configuration data indicating an HDR virtual monitor and, as such, identify HDR video encoder 240. In other examples, an encoding indicator may be received or obtained at the video driver 212 indicating a desired video encoding manager and/or video encoder. For instance, an encoding indicator may be generated and/or provided from the terminal service 210 (e.g., based on an instruction from a remote desktop client device or based on identifiers hard-coded in association with the terminal service or RDP stack) to the video driver 212 indicating a video encoding manager identifier and/or a video encoder identifier for use in performing graphical data encoding. A video encoding manager identifier provides an identification or indication of a particular video encoding manager to load and/or utilize, for example, in association with a remote desktop session. A video encoder identifier provides an identification or indication of a particular video encoder to load and/or utilize, for example, in association with a remote desktop session. In some examples, the encoding indicator is provided from the terminal service 210 via IOCTL. Based on the encoding indicator, the video driver 212 may communicate or direct graphical data accordingly. In some cases, upon the video driver obtaining the encoding indicator (e.g., via IOCTL at the beginning of a remote desktop session), the video driver 212 may initiate loading of the desired video encoding manager 214 and instantiate the HDR video encoder 240 for encoding HDR graphical content.

To communicate with the video encoding manager 214, in some cases, the video driver 212 communicates via an interface, such as encoding interface 230. Encoding interface 230 facilitates a logical separation between video driver 212 and the video encoding manager 214, and tasks associated therewith. In some cases, the encoding interface 230 packages the graphical data obtained from the operating system in a different manner that is suitable to the video encoding manager 214, and/or video encoder(s) 240 associated therewith.

Video encoding manager 214 is generally configured to manage graphical data encoding, such as graphical data encoding performed by video encoder 240. At a high-level, the video encoding manager 214, and/or a video encoder 240 associated therewith, obtains unencoded graphical data (e.g., raw frames) and applies an encoding technique to encode the graphical data for more efficient transmission to a remote desktop client device. In some embodiments, the video encoding manager 214 and/or video encoder 240 may also perform data encapsulation. The video encoding manager 214 and/or video encoder 240 may be initiated in any of a number of ways. In some cases, the video encoding manager 214 and/or video encoder 240 are initiated in conjunction with initiation of the video driver 212. For example, in association with a plug-and-play component identifying to initiate the video driver 212, the video encoding manager 214 and/or video encoder 240 may also be initiated or loaded. As one example, based on a plug-and-play component detecting a display device and identifying to initiate the video driver 212, the Windows Display Driver Model (WDDM) may manage display-related tasks, including loading (e.g., into memory) the video driver 212, the video encoding manager 214, and/or a video encoder 240. In other cases, the video driver 212 (e.g., upon being initiated) may initiate or load the video encoding manager 214 and/or a video encoder 240. For instance, based on an encoding indicator (e.g., including a video encoding manager identifier and/or a video encoder identifier) obtained from the terminal service 210 (via an IOCTL interface), the designated video encoding manager and/or video encoder may be initiated or loaded. By way of example, assume a remote desktop client device has an HDR monitor. In such a case, the remote desktop client device can provide such an indication to the RDP stack 220, which can communicate such an attribute in association with a remote desktop session. Accordingly, the video driver 212 may identify that encoding is desired to be performed in association with the HDR video encoder 240. The HDR video encoder 240 can then be loaded or instantiated and graphical data provided thereto for encoding.

In some cases, the video encoding manager 214 may be in the form of a dynamic link library (DLL). A DLL refers to a file format, which may be used to hold multiple codes and procedures. A DLL allows for code to be shared among different programs, which can reduce disk space and memory usage. Further, a DLL may facilitate a more efficient management and updating of code. Using a DLL that is logically separated from the video driver, or DLL associated therewith, facilitates development of software (e.g., third-party software) that extends or enhances the encoding functionality without requiring modifications to the core video driver itself. As such, a DLL associated with a video driver 212 and a DLL associated with a video encoding manager 214 may be logically separate.

In some cases, the video encoding manager 214 may determine or select a video encoder to use. As shown, the video encoding manager 214 includes HDR video encoder 240. Although not illustrated, additional or alternative video encoders may be included or initiated in association with the video encoding manager 214. A video encoding manager 214 may implement, include, or use any number or type of video encoders (e.g., as needed or suitable to a desired implementation). As such, the video encoding manager 214 may load and/or unload a video encoder as needed.

A video encoder, such as HDR video encoder 240, generally refers to a component that performs encoding of graphical data. In this way, a video encoder may convert graphical data from one format to another to compress it for storage or transmission purposes. By incorporating video encoders into a video encoding manager (e.g., a DLL), a developer can modularize the encoding functionality making it easier to manage and integrate into different software applications.

A video encoder may perform encoding in a particular manner. As such, various video encoders may exist that perform different techniques or manners of encoding graphical data. For example, HDR video encoder 240 generally encodes HDR content into a compressed video format. HDR refers to a technology that allows for a wider range of luminance levels and color gamut compared to standard dynamic range (SDR) content, resulting in more vibrant and lifelike images. One example of an HDR encoder is an H265 High Efficiency Video Coding 444 (HVEC444). An HDR encoder applies compression techniques to reduce the size of the HDR content while preserving its HDR characteristics. Although not illustrated, other examples of video encoders may include an H264 video encoder, an H265 video encoder, and a UMRDP video encoder. An H264 video encoder generally compresses raw graphical data using the H.264 (also referred to as Advanced Video Coding (AVC)) video compression standard, which applies various compression techniques to reduce the size of the data. An H265 video encoder generally compresses raw graphical data using H.265 (also referred to as High Efficiency Video Coding (HEVC)) video compression standard. A UMRDP encoder generally refers to an encoder in association with UMRDP. Various alternative or additional video encoders may be used to provide options for adjusting compression levels, bitrates, resolution, and other parameters to optimize the encoding process for specific use cases.

In some cases, to determine or select a video encoder, such as HDR video encoder 240, to use, the video encoding manager 214 may utilize an encoder indicator, for example, that specifies a video encoder. An encoder indicator generally indicates or provides an instruction related to graphical data encoding. For example, the encoder indicator may instruct the video driver to load and/or use a particular video encoding manager and/or video encoder (e.g., using a video encoding manager identifier and/or a video encoder identifier, respectively). In this regard, an encoding indicator may include a video encoding manager identifier and/or a video encoder identifier. In embodiments, the terminal service 210, such as the RDP stack 220, may provide the encoding indicator to the video driver, for example, via IOCTL. The encoder indicator, or data associated therewith, can then be provided to the video encoding manager 214, for example for use in selecting a video encoder, such as HDR video encoder 240, to use to encode graphical data.

The video encoder 240 encodes graphical data, such as HDR graphical data obtained or output by video driver 212. For example, the video driver 212 may obtain and/or generate graphical output, such as images, GUI elements, and text rendered in specific fonts, understandable by the graphics hardware. Generally, graphical data is typically encoded using video compression techniques, such as Remote FX or H.264. As such, the video encoders described herein generally encode using video compression techniques. Such compression algorithms reduce the size of the graphical data for efficient transmission over the network, thereby optimizing performance and responsiveness during remote desktop sessions. In some cases, however, it may be desirable to convert the graphical output into a text-based representation. For example, character encoding for transmitting textual data and control messages may be performed. As such, an encoding process may, in some cases, encode the graphical data into a sequence of characters using a specific character encoding (e.g., UTF-8). Text-based characters can be used to represent graphical elements, including lines, boxes, and symbols. The remote desktop client display can interpret the encoded characters and displays them on the screen. For example, the remote desktop client device may map the encoded graphical elements back to their visual representations. The remote desktop client's display capabilities may determine how accurately the original graphics are represented.

As described herein, the HDR video encoder 240 may obtain monitor configuration data. For example, the video driver 212 may provide monitor configuration data to the HDR video encoder 240. The HDR video encoder 240 may use the monitor configuration data to facilitate graphical data encoding. For example, graphical data to encode may correspond with monitor context (e.g., as each monitor may function independently from one another). As such, the HDR video encoder 240 may encode the graphical data per monitor instance. In this way, the video encoder may use monitor configuration data to optimize the encoding process and/or improve the viewing experience.

By way of example only, the video encoder can use monitor configuration data to determine an optimal or preferred resolution and aspect ratio for encoding the video. By matching the output resolution and aspect ratio to the native resolution and aspect ratio of the monitor, the encoder ensures that the video will be displayed without distortion or letterboxing. As another example, monitor configuration data may include information about the supported color space and gamut of the display. The video encoder can use this information to ensure that the video is encoded using the appropriate color space and gamut for accurate color reproduction on the monitor. As yet another example, the video encoder can use monitor configuration data to detect HDR capabilities and adjust the encoding settings accordingly.

This may include encoding the video with HDR metadata and using HDR-specific compression techniques to preserve the dynamic range of the content. Further, the video encoder may take into account the refresh rate of the monitor when encoding the video. By matching the frame rate of the video to the refresh rate of the monitor, the video encoder can ensure smooth playback without dropped frames or stuttering. Monitor configuration data may also include information about the supported bit depth and chroma subsampling formats. The video encoder may use such information to determine the optimal encoding settings for preserving image quality while minimizing file size.

In accordance with encoding graphical data, the encoded graphical data is communicated to the terminal service 210 for providing to the remote desktop client device, such as remote desktop client device 102 of FIG. 1. In particular, the encoded graphical data may be communicated to the RDP stack 220 of the terminal service 210 for providing to the remote desktop client device.

The encoded graphical data may be communicated to the RDP stack 220 of the terminal service 210 in a number of ways. In one embodiment, the encoded graphical data is provided to the video driver 212 for providing to the RDP stack 220 (e.g., the transport 222 of the RDP stack). As one example, the video driver 212 may communicate the encoded graphical data using File Input/Output (File I/O) 280. File I/O generally refers to the process of reading from and writing to files on a computer's storage system (e.g., in an asynchronous manner). File I/O may be used to extract encoded graphical data (e.g., frames). In some cases, File I/O opens a channel directly to the video driver, providing greater control over data reads and writes. In one implementation, the HDR video encoder 240, or other component, may wrap an encoded frame(s) into a packet that is communicated through File IO. In some cases, the RDP stack 220 may open a file IO channel to the video driver 212. For instance, the RDP stack may communicate an operation code, or other message, to configure a file IO channel. Configurations may include, for example, a GUID that uniquely identifies a communication channel, a maximum number of packets allowed in the queue before being consumed by the RDP stack, an auxiliary buffer threshold that indicates a timeout (e.g., milliseconds) before an auxiliary buffer is allocated by the video driver if no pending reads are available from the RDP stack.

In one implementation, the RDP stack 220, such as the transport 222, may communicate an IOCTL to the video driver 212. The video driver 212 may convert or translate to a channel offer for the HDR video encoder 240. Such a channel may be represented via a unique identifier (e.g., GUID). In this way, the HDR video encoder 240 may obtain a pointer to the appropriate file I/O channel, such that it can be used for allocating packets. Accordingly, upon encoding graphical data, the HDR video encoder 240 may allocate packets to memory or a buffer associated with the designated file I/O channel, which can then be communicated to the RDP stack 220. Although generally discussed as providing encoded data, other types of data may be communicated via the file I/O channel (e.g., a cursor update). The memory or buffer may be allocated by the transport and delivered by the operating system.

Although File I/O is provided as an example, other delivery mechanisms may be used between the video driver 212 and the RDP stack 220. For example, encoded graphical data (e.g., frames) may be communicated using named pipes or dynamic virtual channels. As another example, a direct connection (e.g., TCP connection) may be used to communicate encoded graphical data to the RDP stack 220. Any of such delivery mechanisms from the video driver 212 to the RDP stack 220 reduces resources utilization otherwise needed to perform copying and synchronization tasks.

In another embodiment, although not illustrated, encoded graphical data may be provided directly from the video encoding manager 214, or the video encoder 240, to the RDP stack 220. For instance, communication between a video encoder and RDP stack 220 may occur using an RDP surface and an update channel. By way of example, the graphical data may be sent to the RDP stack 220 via the RDP surface and/or update channel. RDP surface generally refers to the shared memory between the two different processes. In this way, the RDP surface is the area or buffer where graphical data is temporarily stored before being transmitted over the RDP connection. Generally, the RDP surface supports synchronous operations. In this way, graphical data is copied into the RDP surface and then the terminal service copies the data out of the shared memory (e.g., based on a notification indicating the data is available in shared memory). After the data is removed from the shared memory, the shared memory can be unlocked for the next data or frame. The update channel generally communicates information indicating what portion is changed from one frame to a next frame. In implementations using a RDP surface and/or an update channel, although data is copied, the data is encoded. As such, resource utilization is reduced by synchronizing and copying encoded graphical data.

In receiving the encoded data, the RDP stack 220 provides the encoded graphical data to the remote desktop client device, such as remote desktop client device 102. The remote desktop client device receives the encoded graphical data (e.g., frames), decodes the data, and presents via a display of the remote desktop client device. As the graphical data encoded may be HDR graphical data, the remote desktop client device may present the HDR graphical data via a display device.

Figure 3:
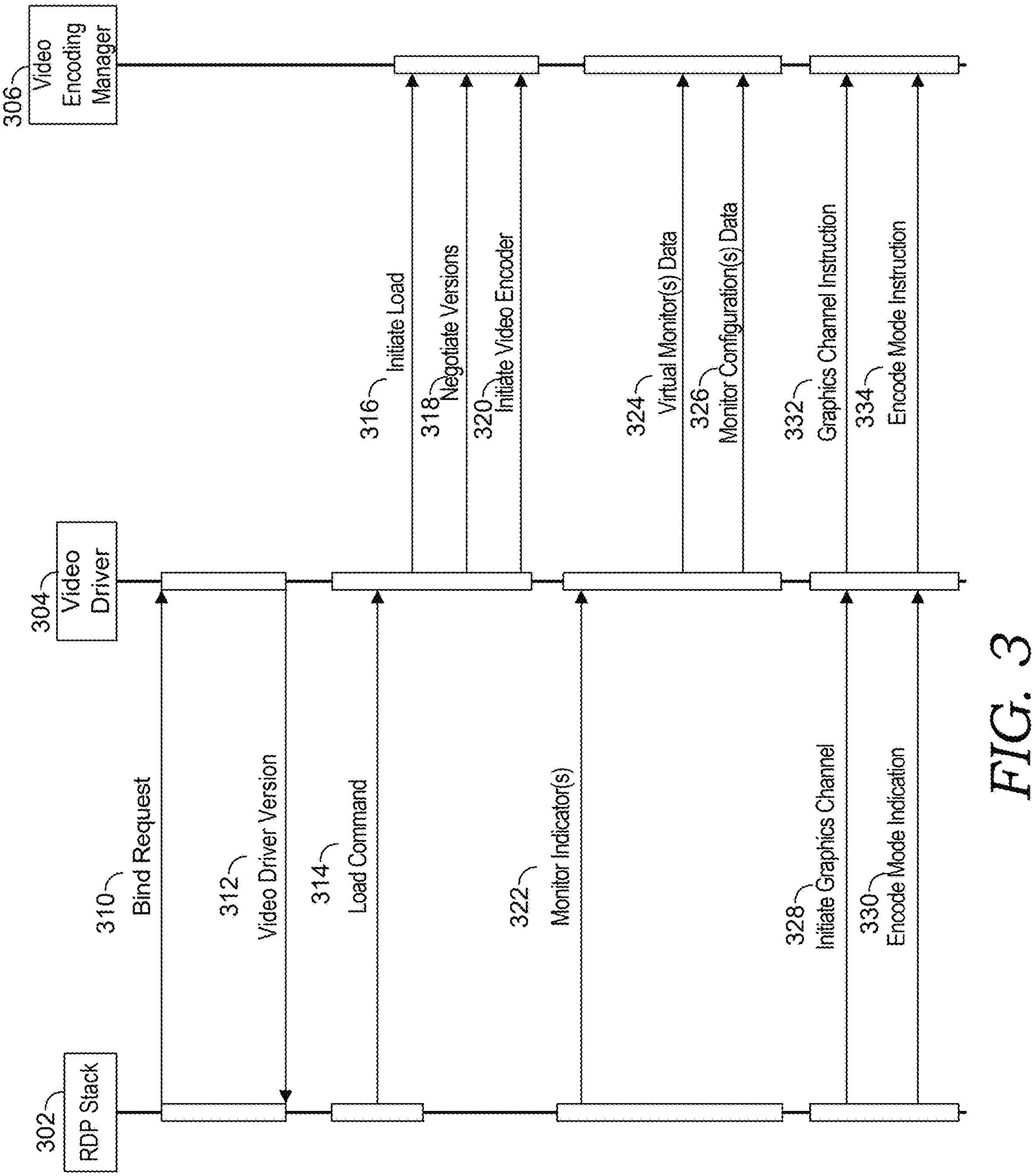
FIG. 3 provides an illustration of a flow diagram between an RDP stack, a video driver, and a video encoding manager, in accordance with embodiments of the present technology.

With reference to FIG. 3, FIG. 3 provides an illustration of a flow diagram 300 between an RDP stack 302, a video driver 304, and a video encoding manager 306. In particular, the flow diagram 300 illustrates the initialization control of flow. Such components reside within a remote desktop server, such as remote desktop server 204 of FIG. 2. In embodiments, the RDP stack 302 is a component of a terminal service, such as terminal service 210 of FIG. 2, of the remote desktop server. The video encoding manager 306 may be a DLL that implements a collection of video encoders. In embodiments, the RDP stack may control which video encoding manager and/or video encoder the video driver should load for a particular connection. In this way, the video encoding manager 306 may be dynamically loaded by the video driver on demand. At a high level, the RDP stack 302 provides the video driver 304 an encoding indicator providing an identification of the video encoding manager to load and an identification of a video encoder to instantiate and to which to provide graphical data for encoding and/or further processing.

As illustrated in FIG. 3, the RDP stack 302 connects or binds the video driver 304 using a bind request 310 provided from the RDP stack 302 to the video driver 304. In response, the video driver 304 may verify the requestor and record a binding process identifier. In addition, the video driver 304 may provide a video driver version 312 back to the RDP stack 302. In accordance with an effective binding between the RDP stack 302 and the video driver 304, the RDP stack may identify a video encoding manager and/or video encoder for utilization in performing graphical data encoding and/or processing. A video encoding manager and/or video encoder may be selected based on any number of attributes. For example, the RDP stack may identify a video encoding manager and/or video encoder based on a video driver version. In some cases, such a video encoding manager and/or video encoder may be indicated via a registry key. In other cases, such a video encoding manager and/or video encoder may be indicated or communicated by the remote desktop client device to the RDP stack. Upon identifying or selecting a video encoding manager and/or video encoder, a load command 314 may be communicated from the RDP stack 302 to the video driver 304. The load command 314 may include an encoding indicator indicating the video encoding manager and/or video encoder to load and/or utilize.

In receiving the load command 314, the video driver 304 may verify the requester. The video driver 304 may also initiate loading 316 of the video encoding manager 306, negotiate versions 318, and/or initiate 320 a desired video encoder. In some cases, the video driver 304 may initiate or instantiate a desired video encoder. In other cases, the video driver 304 may provide an identification of the desired video encoder, which can be used by the video encoding manager 306 to initiate the video encoder.

Returning to the RDP stack 302, the RDP stack can communicate a monitor indicator(s) 322 to the video driver 304. The monitor indicator(s) may include an indication of a monitor(s) being used, or attributes associated therewith. For instance, a monitor indicator may include an indication of a type of monitor(s), a monitor layout, or the like. The video driver 304 may then create a virtual monitor(s) and/or update monitor configuration(s) in accordance therewith. In this regard, data associated with a virtual monitor(s) 324 and/or monitor configuration(s) 326 may be communicated to the video encoding manager 306. The video encoding manager 306, or a portion thereof, may utilize virtual monitors and/or monitor configurations to perform data processing. As such, the video driver 304 may create monitor context objects that indicate a virtual monitor(s) and/or monitor configuration(s).

The RDP stack 302 can also provide a graphics channel initialization 328 and an encode mode indication 330 to the video driver 304 (e.g., via IOCTL). An instruction related to the graphics channel initialization 332 and the encode mode 334 can then be provided to the video encoding manager 306. The graphics channel initialization may initiate a graphics channel for communication, such as for use in communicating update information. A graphics channel may be used to deliver encoded frames, for example, wrapped in MS-RDPEGFX protocol ready to be sent to the client through a GRFX Dynamic Virtual channel. In some cases, a separate mouse channel may be used to update mouse shape and cursor positions (e.g., via MS-RDPEMSC protocol). The encode mode generally indicates a mode to use for encoding. As one example, an encode mode may indicate to use a GPU for encoding graphical data. As another example, an encode mode may indicate to use CPU for encoding graphical data.

Figure 4:
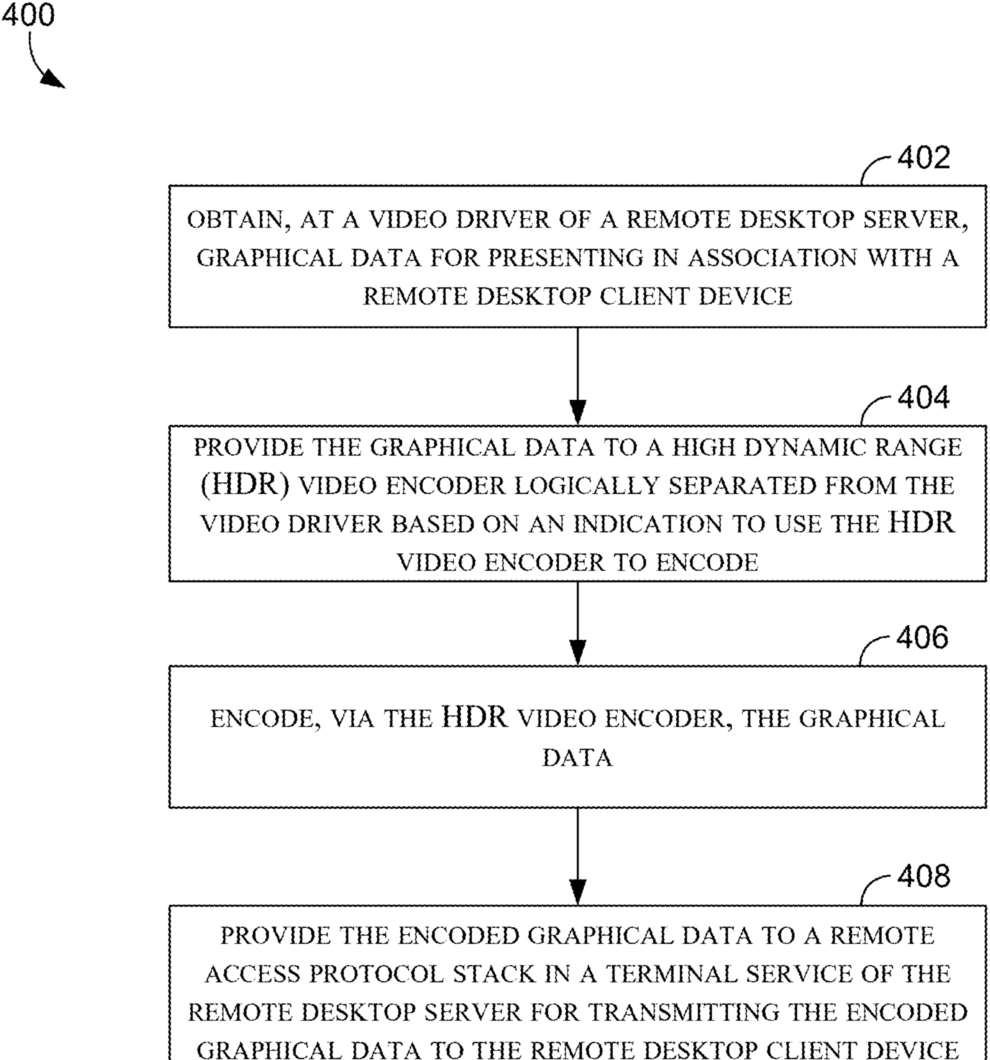
FIG. 4 provides a first example method for facilitating implementation of HDR display technology in remote desktop environment, in accordance with aspects of the technology described herein.
Figure 5:
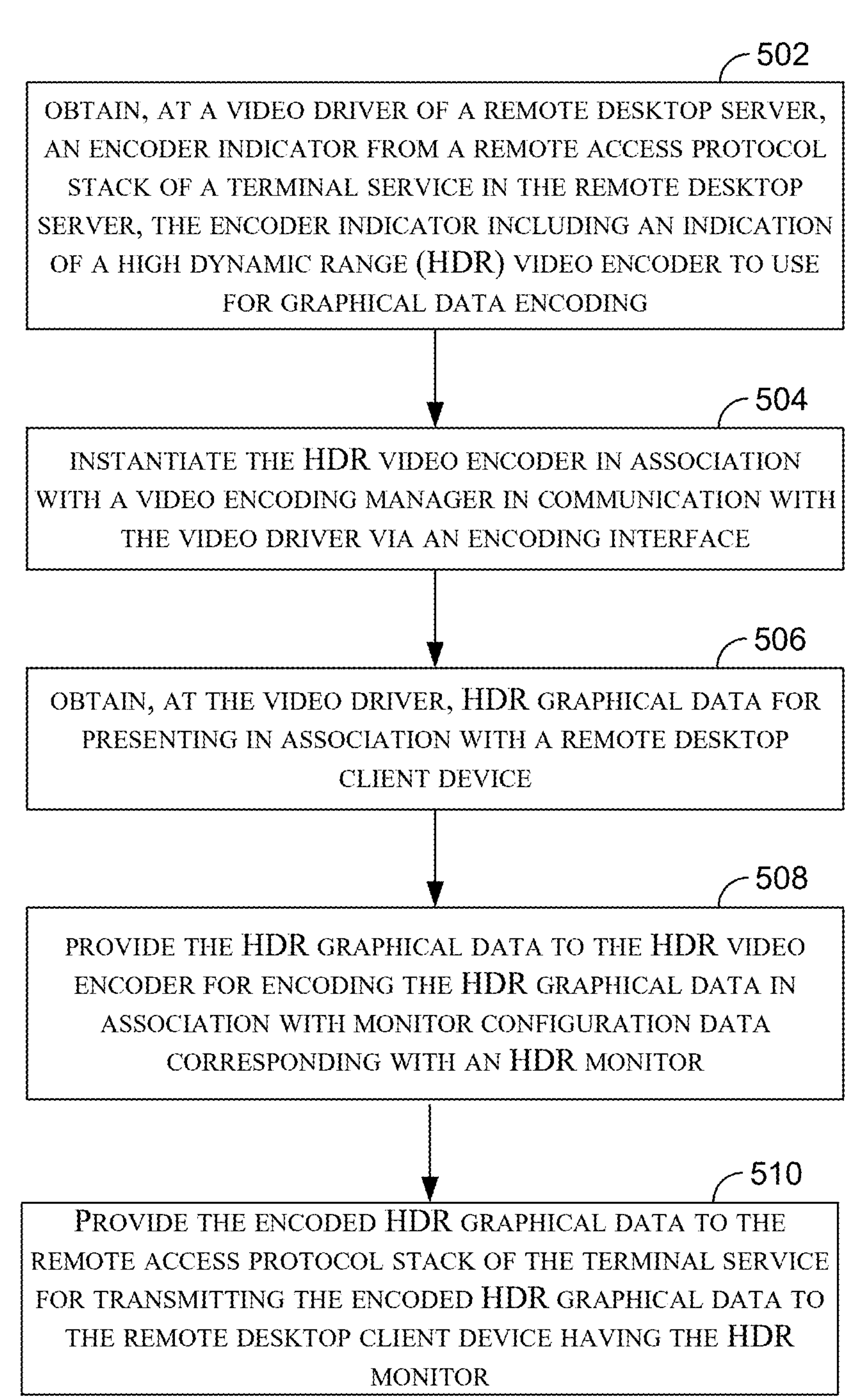
FIG. 5 provides a second example method for facilitating implementation of HDR display technology in remote desktop environment, in accordance with aspects of the technology described herein.
Figure 6:
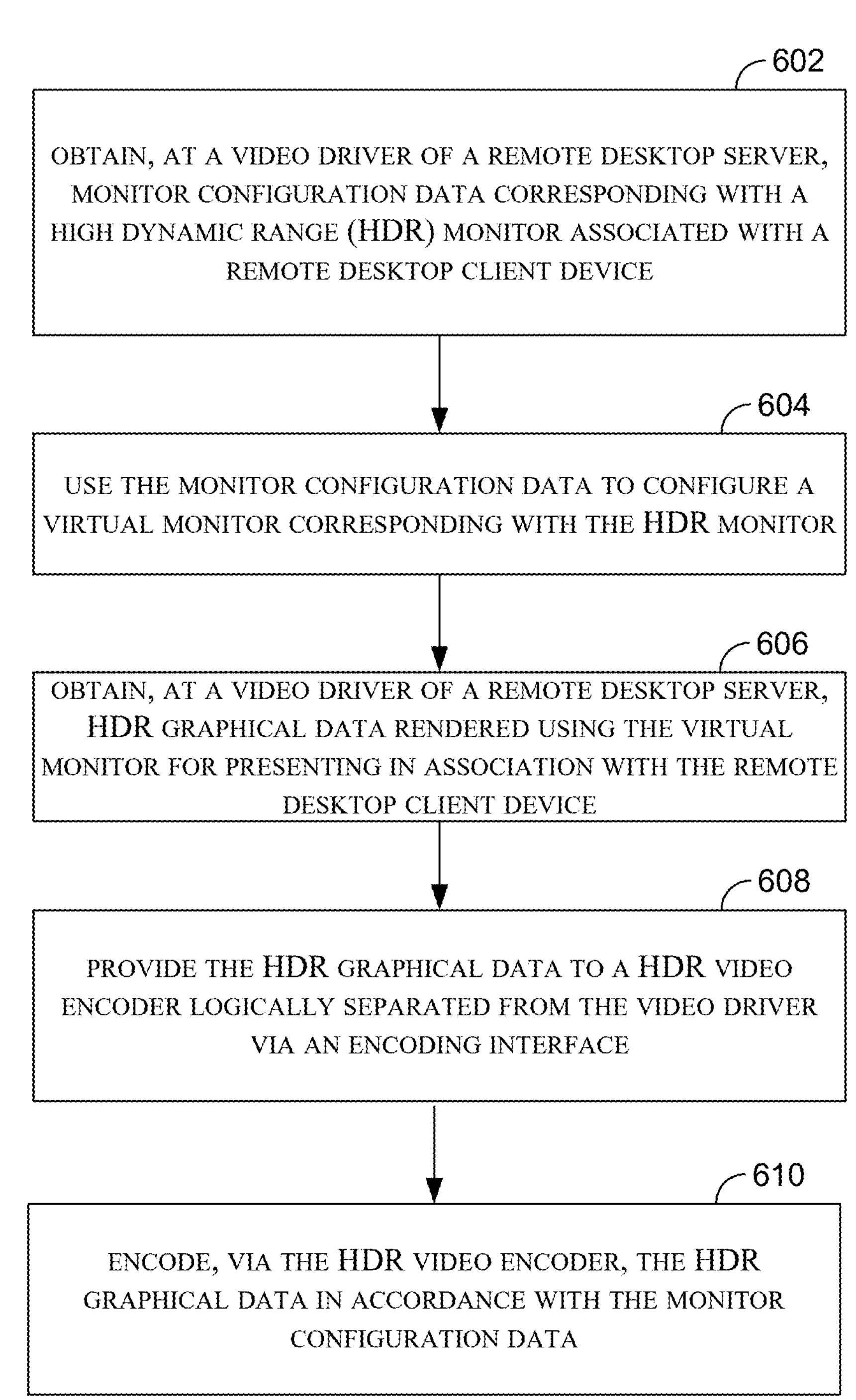
FIG. 6 provides a third example method for facilitating implementation of HDR display technology in remote desktop environment, in accordance with aspects of the technology described herein.

Exemplary Implementations for Facilitating Implementation of High Dynamic Range Display Technology in a Remote Desktop Environment As described, various implementations can be used in accordance with embodiments described herein. FIGS. 4-6, FIGS. 4-6 provide example methods of facilitating implementation of high dynamic range display technology in a remote desktop environment. Methods 400, 500, and 600 can be performed by a computer device, such as device 700 described below. The flow diagrams represented in FIGS. 4-6 are intended to be exemplary in nature and not limiting.

Turning initially to method 400 of FIG. 4, method 400 is directed to facilitating implementation of high dynamic range display technology in a remote desktop environment, in accordance with embodiments of the present technology. Initially, at block 402, graphical data for presenting in association with a remote desktop client device is obtained at a video driver of a remote desktop server. The graphical data obtained at the video driver includes a graphical surface where each pixel is represented using at least eight bytes of data. The graphical data may be rendered in accordance with a virtual monitor established in association with monitor configuration data corresponding with an HDR monitor. Monitor configuration data may be provided by the remote access protocol stack to the video driver for configuring the virtual monitor. In embodiments, the graphical data includes data rendered by a graphics processing unit and/or a central processing unit based on an instruction provided by the video driver. For example, the video driver may provide rendering instructions to a hardware or software component performing the encoding and, in response, obtain the rendered data. The video driver may, in some cases, process the rendered data to prepare the data for presentation via a remote desktop client device. In some cases, the graphical data is obtained at the video driver via a frame buffer that stores data rendered by a graphics processing unit or central processing unit.

At block 404, the graphical data is provided to an HDR video encoder logically separated from the video driver. The graphical data may be provided to the HDR video encoder based on an indication to use the HDR video encoder to encode. In embodiments, the graphical data is provided to the video encoder via an encoding interface. The video encoder may be initiated in any number of ways. As one example, the video encoder is initiated based on an encoding indicator, communicated by the remote access protocol stack to the video driver, that includes an indication of the video encoder to use for encoding in association with a remote desktop session. The encoding indicator may be communicated to the video driver in accordance with establishing the remote desktop session. In some cases, the encoding indicator further includes an indication of a dynamic link library or video encoding manager that includes the video encoder.

At block 406, the graphical data is encoded via the HDR video encoder. In embodiments, the graphical data is encoded in accordance with monitor configuration data corresponding with an HDR monitor. In some cases, the monitor configuration data may be provided to the HDR video encoder, for example, from the video driver. Such monitor configuration data may include data associated with various monitor attributes. As one example, the monitor configuration data may include an attribute associated with HDR display technology, such as, for instance, colorimetry, SDR white level, and/or the like.

At block 408, the encoded graphical data is provided to a remote access protocol stack in a terminal service of the remote desktop server for transmitting the encoded graphical data to the remote desktop client device associated with an HDR monitor. In one embodiment, the encoded graphical data is provided from the video encoder to the video driver for providing to the remote access protocol stack via a file input/output communication channel. In some cases, the HDR video encoder provides the encoded graphical data to a buffer associated with the file input/output communication channel in accordance with a channel pointer referencing the file input/output communication channel. Such a channel pointer may be provided to the HDR video encoder from the video driver.

Turning to method 500 of FIG. 5, method 500 is directed to facilitating implementation of HDR display technology in a remote desktop environment, in accordance with embodiments of the present technology. Initially, at block 502, an encoder indicator is obtaining at a video driver of a remote desktop server from a remote access protocol stack of a terminal service in the remote desktop server. The encoder indicator may include an indication of an HDR video encoder to use for graphical data encoding. In some embodiments, the encoder indicator further includes an indication of the video encoding manager and, based on the indication of the video encoding manager, initiating the video encoding manager.

At block 504, the video encoder is instantiated in association with a video encoding manager in communication with the video driver via an encoding interface. For example, based on the encoder indicator indicating a particular video encoder, the video driver may instantiate the particular video encoder for use in encoding data.

At block 506, HDR graphical data is obtained at the video driver for presenting in association with a remote desktop client device. Such HDR graphical data may be obtained, for example, from a frame buffer including frames rendered by a rendering component, such as a GPU and/or CPU. In embodiments, HDR graphical data is obtained at the video driver based on configuring a virtual monitor using the monitor configuration data. Such monitor configuration data may include, for example, an indication of a configuration mode, a display mode, a scale factor, a physical size, a colorimetry, a SDR white level, a monitor description, and/or container information.

At block 508, the HDR graphical data is provided to the HDR video encoder for encoding the graphical data in association with monitor configuration data corresponding with an HDR monitor. In some cases, the HDR video encoder to use for graphical data encoding is identified at the remote access protocol stack based on information provided by the remote desktop client device. In embodiments, the HDR video encoder encodes data in accordance with the monitor configuration data corresponding with the HDR monitor. Such monitor configuration data may be provided to the HDR video encoder from the video driver.

At block 510, the encoded HDR graphical data is provided to the remote access protocol stack of the terminal service for transmitting the encoded graphical data to the remote desktop client device having the HDR monitor. In some embodiments, the HDR video encoder provides the encoded HDR graphical data, via the encoding interface, to the video driver to provide to the remote access protocol stack. In other embodiments, the HDR video encoder directly provides the encoded graphical data to the remote access protocol stack.

Turning to method 600 of FIG. 6, method 600 is directed to implementation of HDR display technology in a remote desktop environment, in accordance with embodiments of the present technology. Initially, at block 602, monitor configuration data corresponding with a high dynamic range (HDR) monitor associated with a remote desktop client device is obtained at a video driver of a remote desktop server. In some embodiments, the monitor configuration data is extracted from extended display identification data and/or a display identifier.

At block 604, the monitor configuration data is used to configure a virtual monitor corresponding with the HDR monitor. In this way, the virtual monitor may be configured in accordance with monitor configuration data indicating HDR attributes associated with an HDR monitor.

At block 606, HDR graphical data rendered using the virtual monitor for presenting in association with the remote desktop client device is obtained at a video driver of a remote desktop server. For example, a GPU may facilitate rendering HDR graphical data in accordance with the virtual monitor and provide such data to a buffer for access by the video driver.

At block 608, the HDR graphical data is provided to an HDR video encoder logically separated from the video driver via an encoding interface. Thereafter, at block 610, the HDR graphical data is encoded via the HDR video encoder in accordance with the monitor configuration data. The encoded HDR graphical data may be provided to a remote desktop protocol stack in a terminal service of the remote desktop server, for example, via a packet communicated over a file input/output channel. Further, the remote desktop protocol stack may transmit the encoded HDR graphical data to the remote desktop client device for presentation via the HDR monitor of the remote desktop client device. In embodiments, the encoding may be performed in accordance with monitor configuration data, for example, provided to the HDR video encoder via the video driver.

Accordingly, we have described various aspects of technology directed to systems, and methods for facilitating efficient advanced video encoding in a remote desktop environment. It is understood that various features, sub-combinations, and modifications of the embodiments described herein are of utility and may be employed in other embodiments without reference to other features or sub-combinations. Moreover, the order and sequences of steps shown in the example methods 400, 500, and 600 are not meant to limit the scope of the present disclosure in any way, and in fact, the steps may occur in a variety of different sequences within embodiments hereof. Such variations and combinations thereof are also contemplated to be within the scope of embodiments of this disclosure.

In some embodiments, a computerized system, such as the computerized system described in any of the embodiments above, comprises one or more processors, and one or more computer storage media storing computer-useable instructions that, when executed by the one or more processors, cause the one or more processors to perform operations. The operations comprise obtaining, at a video driver of a remote desktop server, graphical data for presenting in association with a remote desktop client device. The operations may further comprise providing the graphical data to an HDR video encoder, logically separated from the video driver, based on an indication to use the HDR video encoder to encode. The operations may further comprise encoding, via the HDR video encoder, the graphical data. The operations may further comprise providing the encoded graphical data to a remote access protocol stack in a terminal service of the remote desktop server for transmitting the encoded graphical data to the remote desktop client device associated with an HDR monitor. In this way, embodiments of this disclosure enable an improved implementation of implementing HDR video technology in a remote desktop environment. Further, in this way, embodiments, as described herein, reduce computing resources used in performing video encoding by limiting or avoiding synchronizing and/or copying unencoded data from the video driver to the remote access protocol stack. Moreover, embodiments, as described herein, enable implementing HDR display technology in a remote desktop environment by effectively using monitor configuration data.

In any combination of the above embodiments of the computerized system, the encoded graphical data is provided to the remote access protocol stack via a file input/output communication channel.

In any combination of the above embodiments of the computerized system, the HDR video encoder provides the encoded graphical data to a buffer associated with the file input/output communication channel in accordance with a channel pointer referencing the file input/output communication channel.

In any combination of the above embodiments of the computerized system, the video driver provides the channel pointer to the HDR video encoder.

In any combination of the above embodiments of the computerized system, the graphical data obtained at the video driver includes a graphical surface where each pixel is represented using at least eight bytes of data.

In any combination of the above embodiments of the computerized system, the graphical data obtained at the video driver includes the graphical surface where each pixel is represented using the at least eight bytes of data based on a virtual monitor established in association with monitor configuration data corresponding with the HDR monitor.

In any combination of the above embodiments of the computerized system, the monitor configuration data is provided by the remote access protocol stack to the video driver for configuring the virtual monitor.

In any combination of the above embodiments of the computerized system, the HDR video encoder is initiated based on an encoding indicator, communicated by the remote access protocol stack to the video driver, that includes an indication of the HDR video encoder to use for encoding in association with a remote desktop session.

In any combination of the above embodiments of the computerized system, monitor configuration data corresponding with the HDR monitor is provided to the HDR video encoder for use in encoding the graphical data.

In any combination of the above embodiments of the computerized system, monitor configuration data includes an attribute associated with HDR display technology.

In other embodiments, a computer-implemented method is provided. The method includes obtaining, at a video driver of a remote desktop server, an encoder indicator from a remote access protocol stack of a terminal service in the remote desktop server, the encoder indicator including an indication of a video encoder to use for graphical data encoding. The method may further include instantiating the video encoder in association with a video encoding manager in communication with the video driver via an encoding interface. The method may further include causing obtaining, at the video driver, HDR graphical data for presenting in association with a remote desktop client device. The method may further include providing the HDR graphical data to the HDR video encoder for encoding the HDR graphical data in association with monitor configuration data corresponding with an HDR monitor. The method may further include providing the encoded HDR graphical data to the remote access protocol stack of the terminal service for transmitting the encoded HDR graphical data to the remote desktop client device. In this way, embodiments of this disclosure enable an improved implementation of implementing HDR video technology in a remote desktop environment. Further, in this way, embodiments, as described herein, reduce computing resources used in performing video encoding by limiting or avoiding synchronizing and/or copying unencoded data from the video driver to the remote access protocol stack. Moreover, embodiments, as described herein, enable implementing HDR display technology in a remote desktop environment by effectively using monitor configuration data.

In any combination of the above embodiments of the computer-implemented method, the HDR video encoder to use for graphical data encoding is identified at the remote access protocol stack based on information provided by the remote desktop client device.

In any combination of the above embodiments of the computer-implemented method, the method further includes providing, from the video driver, the monitor configuration data corresponding with the HDR monitor to the HDR video encoder to use in encoding the HDR graphical data.

In any combination of the above embodiments of the computer-implemented method, the HDR graphical data is obtained at the video driver based on configuring a virtual monitor using the monitor configuration data.

In any combination of the above embodiments of the computer-implemented method, the monitor configuration data includes an indication of a configuration mode, a display mode, a scale factor, a physical size, a colorimetry, a Standard Dynamic Range (SDR) white level, a monitor description, and/or container information.

In other embodiments, one or more computer storage media having computer-executable instructions embodied thereon that, when executed by one or more processors, cause the one or more processors to perform a method is provided. The method includes obtaining, at a video driver of a remote desktop server, monitor configuration data corresponding with a high dynamic range (HDR) monitor associated with a remote desktop client device. The method also includes using the monitor configuration data to configure a virtual monitor corresponding with the HDR monitor. The method may further include obtaining, at a video driver of a remote desktop server, HDR graphical data rendered using the virtual monitor for presenting in association with the remote desktop client device. The method may further include providing the HDR graphical data to an HDR video encoder logically separated from the video driver via an encoding interface. The method may also include encoding, via the HDR video encoder, the HDR graphical data in accordance with the monitor configuration data. In this way, embodiments of this disclosure enable an improved implementation of implementing HDR video technology in a remote desktop environment. Further, in this way, embodiments, as described herein, reduce computing resources used in performing video encoding by limiting or avoiding synchronizing and/or copying unencoded data from the video driver to the remote access protocol stack. Moreover, embodiments, as described herein, enable implementing HDR display technology in a remote desktop environment by effectively using monitor configuration data. In any combination of the above embodiments of the media, the video driver corresponds with a remote desktop session, and the video driver instantiates the video encoder based on receiving an indication to use the video encoder in association with the remote desktop session.

In any combination of the above embodiments of the media, the method may further include providing the encoded HDR graphical data to a remote desktop protocol stack in a terminal service of the remote desktop server via a packet communicated over a file input/output channel.

In any combination of the above embodiments of the media, the method may further include transmitting, via the remote desktop protocol stack, the encoded HDR graphical data to the remote desktop client device for presentation via the HDR monitor of the remote desktop client device.

In any combination of the above embodiments of the media, the video driver provides the monitor configuration data to the HDR video encoder to use in encoding the HDR graphical data.

In any combination of the above embodiments of the media, the monitor configuration data is extracted from extended display identification data (EDID) or display identifier (DisplayID).

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 7:
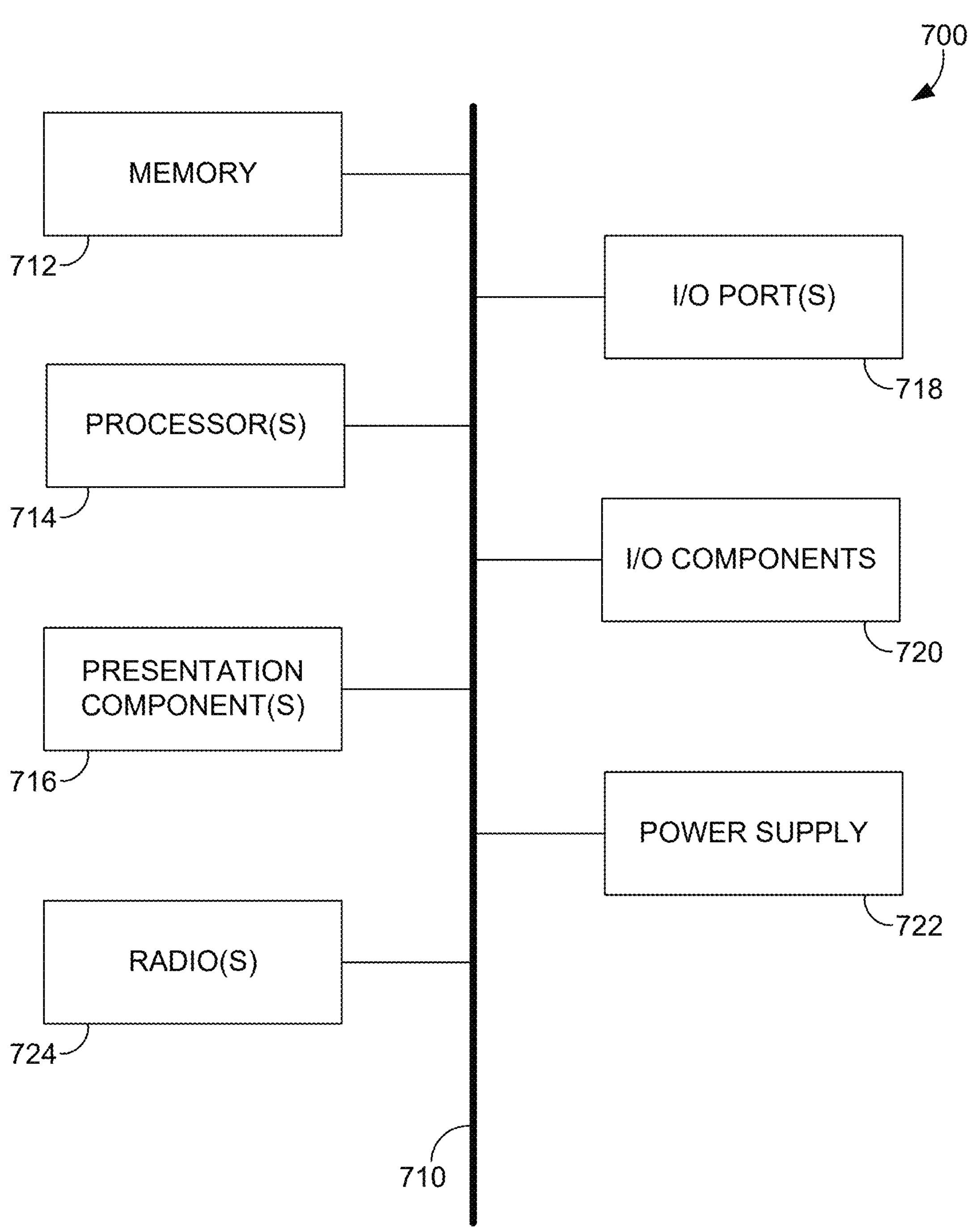
FIG. 7 is a block diagram of an exemplary computing environment suitable for use in implementing aspects of the technology described herein.

Referring to the drawings in general, and to FIG. 7 in particular, an exemplary operating environment for implementing aspects of the technology described herein is shown and designated generally as computing device 700. Computing device 700 is just one example of a suitable computing environment and is not intended to suggest any limitation as to the scope of use or functionality of the technology described herein. Neither should the computing device 800 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, an illustrative power supply 722, and a radio(s) 724. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more aspects of the technology described herein. Distinction is not made between such categories as "workstation," "server," "laptop," and "handheld device," as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, and optical-disc drives. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, and vibrating component. I/O port(s) 718 allow computing device 700 to be logically coupled to other devices including I/O components 720, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 700. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include radio(s) 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computing system comprising:

a processor; and computer storage memory having computer-executable instructions stored thereon which, when executed by the processor, configure the computing system to perform operations comprising:

obtaining, at a video driver of a remote desktop server, graphical data for presenting in association with a remote desktop client device, the graphical data including a graphical surface where each pixel is represented using at least eight bytes of data in accordance with a virtual monitor established in association with monitor configuration data corresponding with a high dynamic range (HDR) monitor;

providing the graphical data to an HDR video encoder, logically separated from the video driver via an encoding interface, based on an encoding indicator to use the HDR video encoder, of a plurality of video encoders, to perform encoding;

encoding, via the HDR video encoder, the graphical data; and providing the encoded graphical data to a remote access protocol stack in a terminal service of the remote desktop server for transmitting the encoded graphical data to the remote desktop client device associated with the HDR monitor.

2. The computing system of claim 1, wherein the encoded graphical data is provided to the remote access protocol stack via a file input/output communication channel.

3. The computing system of claim 2, wherein the HDR video encoder provides the encoded graphical data to a buffer associated with the file input/output communication channel in accordance with a channel pointer referencing the file input/output communication channel.

4. The computing system of claim 3, wherein the video driver provides the channel pointer to the HDR video encoder.

5. The computing system of claim 1, wherein the monitor configuration data is provided by the remote access protocol stack to the video driver for configuring the virtual monitor.

6. The computing system of claim 1, wherein the HDR video encoder is initiated based on the encoding indicator, communicated by the remote access protocol stack to the video driver, that includes an indication of the HDR video encoder to use for encoding in association with a remote desktop session.

7. The computing system of claim 1, wherein the monitor configuration data corresponding with the HDR monitor is provided to the HDR video encoder for use in encoding the graphical data.

8. The computing system of claim 7, wherein the monitor configuration data includes an attribute associated with HDR display technology.

9. A computer-implemented method comprising:

obtaining, at a video driver of a remote desktop server, an encoder indicator from a remote access protocol stack of a terminal service in the remote desktop server, the encoder indicator including an indication of a high dynamic range (HDR) video encoder to use for graphical data encoding;

instantiating the HDR video encoder in association with a video encoding manager in communication with the video driver via an encoding interface;

obtaining, at the video driver, HDR graphical data for presenting in association with a remote desktop client device, the HDR graphical data including a graphical surface where each pixel is represented using at least eight bytes of data in accordance with a virtual monitor established in association with monitor configuration data corresponding with an HDR monitor;

providing the HDR graphical data to the HDR video encoder, logically separated from the video driver via an encoding interface, for encoding the HDR graphical data in association with the monitor configuration data corresponding with the HDR monitor; and providing the encoded HDR graphical data to the remote access protocol stack of the terminal service for transmitting the encoded HDR graphical data to the remote desktop client device having the HDR monitor.

10. The method of claim 9, wherein the HDR video encoder to use for graphical data encoding is identified at the remote access protocol stack based on information provided by the remote desktop client device.

11. The method of claim 9 further comprising providing, from the video driver, the monitor configuration data corresponding with the HDR monitor to the HDR video encoder to use in encoding the HDR graphical data.

12. The method of claim 9, wherein the HDR graphical data is obtained at the video driver based on configuring the virtual monitor using the monitor configuration data.

13. The method of claim 9, wherein the monitor configuration data includes an indication of a configuration mode, a display mode, a scale factor, a physical size, a colorimetry, a Standard Dynamic Range (SDR) white level, a monitor description, and/or container information.

14. One or more computer storage media having computer-executable instructions embodied thereon that, when executed by one or more processors, cause the one or more processors to perform a method, the method comprising:

obtaining, at a video driver of a remote desktop server, monitor configuration data corresponding with a high dynamic range (HDR) monitor associated with a remote desktop client device;

using the monitor configuration data to configure a virtual monitor corresponding with the HDR monitor;

obtaining, at a video driver of a remote desktop server, HDR graphical data rendered using the virtual monitor for presenting in association with the remote desktop client device, the HDR graphical data including a graphical surface where each pixel is represented using at least eight bytes of data in accordance with the virtual monitor established in association with the monitor configuration data corresponding with the HDR monitor;

providing the HDR graphical data to an HDR video encoder, logically separated from the video driver via an encoding interface, based on an encoding indicator to use the HDR video encoder, of a plurality of video encoders to perform encoding; and encoding, via the HDR video encoder, the HDR graphical data in accordance with the monitor configuration data.

15. The media of claim 14, wherein the method further comprises providing the encoded HDR graphical data to a remote desktop protocol stack in a terminal service of the remote desktop server via a packet communicated over a file input/output channel.

16. The media of claim 15, wherein the method further comprises transmitting, via the remote desktop protocol stack, the encoded HDR graphical data to the remote desktop client device for presentation via the HDR monitor of the remote desktop client device.

17. The media of claim 14, wherein the video driver provides the monitor configuration data to the HDR video encoder to use in encoding the HDR graphical data.

18. The media of claim 14, wherein the monitor configuration data is extracted from extended display identification data (EDID) or display identifier (DisplayID).

* * * * *